US012116879B2

(12) United States Patent  
Chen

(10) Patent No.: US 12,116,879 B2  
(45) Date of Patent: Oct. 15, 2024

(54) CLASSIFICATION AND CONTROL OF DETECTED DRILLING VIBRATIONS USING MACHINE LEARNING

(71) Applicant: Halliburton Energy Services, Inc., Houston, TX (US)

(72) Inventor: Shilin Chen, Montgomery, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 634 days.

(21) Appl. No.: 17/130,189

(22) Filed: Dec. 22, 2020

(65) Prior Publication Data

US 2022/0195862 A1 Jun. 23, 2022

(51) Int. Cl.
| | |
|---|---|
| *E21B 44/02* | (2006.01) |
| *E21B 47/013* | (2012.01) |
| *E21B 47/18* | (2012.01) |
| *G06N 20/20* | (2019.01) |

(52) U.S. Cl.
CPC ............ *E21B 44/02* (2013.01); *E21B 47/013* (2020.05); *E21B 47/18* (2013.01); *G06N 20/20* (2019.01); *E21B 2200/22* (2020.05)

(58) Field of Classification Search
CPC .......... E21B 44/00; E21B 44/02; E21B 44/08; E21B 47/013; E21B 47/18
See application file for complete search history.

(56) References Cited

U.S. PATENT DOCUMENTS

| 2016/0115778 A1* | 4/2016 | van Oort ............... G06N 20/00 |
| | | 175/27 |
| 2017/0268324 A1* | 9/2017 | Moore .................... G01V 1/52 |
| 2020/0284099 A1* | 9/2020 | Hassani ................. E21B 44/00 |
| 2022/0025758 A1* | 1/2022 | Mora ..................... E21B 44/00 |

FOREIGN PATENT DOCUMENTS

WO 2019222122 A1 11/2019

OTHER PUBLICATIONS

Baumgartner, et al., "Pure and Coupled Drill String Vibration Pattern Recognition in High Frequency Downhole Data", SPE Annual Technical Conference and Exhibition, Oct. 27-29, 2014, Amsterdam, The Netherlands, 23 pages.

(Continued)

*Primary Examiner* — Manuel L Barbee  
(74) *Attorney, Agent, or Firm* — DeLizio, Peacock, Lewin & Guerra, LLP

(57) ABSTRACT

A vibrational disfunction machine learning model trainer trains a vibrational disfunction classifier to identify one or more types of vibrational disfunction, or normal drilling, based on measurements of at least one of displacement, velocity, acceleration, angular displacement, angular velocity, and angular acceleration acquired for the drill bit. The vibrational disfunction machine learning model trainer trains the algorithm based on data sets corresponding to characteristic behavior for one or more types of vibrational disfunction and normal drilling. The vibrational disfunction classifier operates in real time, and can operate at the drill bit and communicate vibrational disfunction identification in real time, allowing mitigation of vibrational disfunction through adjustment of drilling parameters.

29 Claims, 25 Drawing Sheets

(56) References Cited

OTHER PUBLICATIONS

Chen, et al., "Identification and Mitigation of Friction- and Cutting Action-Induced Stick-Slip Vibrations with PDC Bits", Society of Petroleum Engineers, IADC/SPE International Drilling Conference and Exhibition, Mar. 3-5, 2020, Galveston, Texas, USA.

Dashevskiy, et al., "Application of Neural Networks for Predictive Control in Drilling Dynamics", Society of Petroleum Engineers, SPE Annual Technical Conference and Exhibition, Oct. 3-6, 1999, Houston, Texas, 9 pages.

Heisig, et al., "Downhole Diagnosis of Drilling Dynamics Data Provides New Level Drilling Process Control to Driller" Society of Petroleum Engineers, SPE Annual Technical Conference and Exhibition, Sep. 27-30, 1998, New Orleans, Louisiana, 10 pages.

Hutchinson, et al., "An MWD Downhole Assistant Driller", Society of Petroleum Engineers, SPE Annual Technical Conference and Exhibition, Oct. 22-25, 1995, Dallas, Texas, 10 pages.

Millan, et al., "Real-Time Drillstring Vibration Characterization Using Machine Learning", Society of Petroleum Engineers, SPE/IADC International Drilling Conference and Exhibition, Mar. 5-7, 2019, The Hague, The Netherlands.

* cited by examiner

CLASSIFICATION AND CONTROL OF DETECTED DRILLING VIBRATIONS USING MACHINE LEARNING

TECHNICAL FIELD

The disclosure generally relates to earth drilling including mining and earth drilling, e.g., deep drilling, for obtaining oil, gas, water, soluble or meltable materials or a slurry of minerals from wells.

BACKGROUND

In earth drilling, mechanical energy is applied to deform and fracture geological formations in order to create wellbores or otherwise access geological assets. During drilling, drill bits and bottom hole assemblies experience several types of vibrational or oscillational drilling disfunctions (i.e., non-idealities) due to friction and other interactions between the drilling surfaces of the bit and formation faces and drilling fluid. Drilling energy lost to vibrations reduces drilling efficiency and excites frequencies, including resonant frequencies, in the drill string that damage both the drill bit and drill string. Classes of disfunctions, such as stick-slip, backward whirl, etc., are identified by their characteristic bottom hole assembly (BHA) behavior.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to mud pulse telemetry in illustrative examples. Aspects of this disclosure can be instead applied to other data transmission types such as: optical fiber, digital or analog electrical line, radiofrequency transmission, etc. In other instances, well-known instruction instances, protocols, structures, and techniques have not been shown in detail in order not to obfuscate the description.

Overview

Vibrational disfunctions include: cutting induced stick-slip, friction induced stick-slip, friction-and-cutting-induced stick-slip, drill-pipe induced stick-slip (also known as pseudo stick-slip), three-dimensional coupled vibrations (including high frequency torsional oscillations), high frequency torsional noise, cutting-induced backward whirl, friction-induced backward whirl, etc. Each disfunction and normal drilling behavior correspond to characteristic drill bit behavior—as measured via drill bit displacement and acceleration, including rotational acceleration. Characteristic drill bit behavior can correspond to more than one cause of disfunction.

A machine learning model is trained on multiple identified examples of each type vibrational disfunction to detect and classify vibrational disfunctions and normal drilling behavior. The trained machine learning model is deployed with the drill bit, and operates downhole during drilling. For each time period during drilling, vibrational disfunctions are identified downhole at the drill bit by the trained machine learning model operating on drill bit displacement and acceleration measurements. The identity of the detected disfunction or normal drilling behavior is then transmitted to the surface or other drilling control site via mud pulse telemetry or another data transmission method. Knowledge of the type and cause of drilling disfunction allows drilling parameter adjustment to mitigate the identified drilling disfunction and improve drilling efficiency.

Example Illustrations

Figure 1:
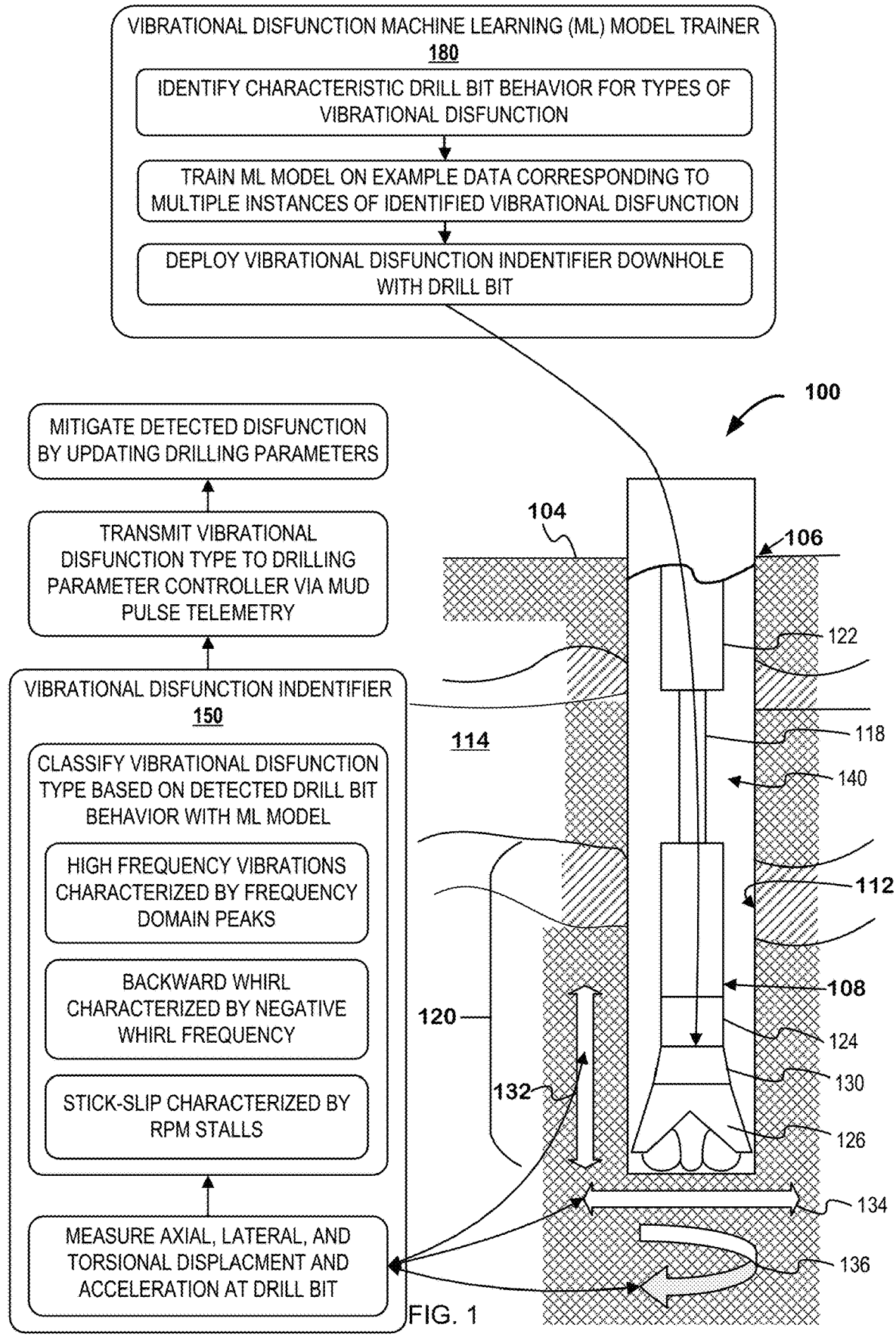
FIG. 1 illustrates an example system for identifying vibrational disfunction in real time via a machine learning (ML) model.

FIG. 1 illustrates an example system for identifying vibrational disfunction in real time via a machine learning (ML) model. FIG. 1 includes a schematic diagram of a drilling apparatus 100, including a drill bit 126 in a borehole 112, a schematic diagram of a vibrational disfunction classifier 150, and vibrational disfunction ML model trainer 180.

Drilling of oil and gas wells is commonly carried out using a string of drill pipes connected together so as to form a drilling string 108 that is lowered through a rotary table into a wellbore or borehole 112. The drill string 108 may operate to penetrate the rotary table for drilling the borehole 112 through subsurface formations 114. The drill string 108 may include a Kelly, drill pipe 118, and a bottom hole assembly (BHA) 120, perhaps located at the lower portion of the drill pipe 118. A drilling apparatus 100 may also include a drilling rig located at the surface 104 of a well 106, which is not shown here for simplicity.

The BHA 120 may include drill collars 122, a down hole tool 124, and a drill bit 126. The drill bit 126 may operate to create a borehole 112 by penetrating the surface 104 and subsurface formations 114. The down hole tool 124 may comprise any of a number of different types of tools including a mud pump, MWD tools, LWD tools, and others. The drill bit 126 includes a vibration measurement tool 130, which measures vibrations of the drill bit as a function of time. The vibration measurement tool 130 is shown as part of the drill bit 126 but can also be located in another area of the BHA 120, including inside the drill bit 126. The vibration measurement tool 130 measures at least one of displacement, acceleration (including rotational acceleration), or speed along three axes of vibrations: axial direction 132, lateral direction 134, and torsional direction 136.

During drilling operations, the drill string 108 (perhaps including the Kelly, the drill pipe 118, and the BHA 120) may be rotated by the rotary table. In addition to, or alternatively, the BHA 120 may also be rotated by a motor (e.g., a mud motor) that is located down hole. The drill collars 122 may be used to add weight to the drill bit 126. The drill collars 122 may also operate to stiffen the BHA 120, allowing the BHA 120 to transfer the added weight to the drill bit 126, and in turn, to assist the drill bit 126 in penetrating the surface 104 and subsurface formations 114.

During drilling operations, a mud pump may pump drilling fluid (sometimes known by those of ordinary skill in the art as "drilling mud") from a mud pit through a hose into the drill pipe and down to the drill bit 126. The drilling fluid can flow out from the drill bit 126 and be returned to the surface 104 through an annular area 140 between the drill pipe 118 and the sides of the borehole 112. The drilling fluid may then be returned to the mud pit, where such fluid is filtered. In some embodiments, the drilling fluid can be used to cool the drill bit 126, as well as to provide lubrication for the drill bit 126 during drilling operations. Additionally, the drilling fluid may be used to remove subsurface formation 114 cuttings created by operating the drill bit 126.

The vibrational disfunction classifier 150 can be located within the vibration measurement tool 130 or at another location in the BHA 120 such as within the drill bit 126, such that the vibration disfunction classifier 150 and the vibration measurement tool 130 are in communication. The vibrational disfunction classifier 150 may transmit identified disfunction types to an operator or other drilling controller via mud pulse telemetry, optical fiber, electromagnetic transmission, electrical signals, etc. The transmission can comprise or trigger a communication to a user or user software, a notification on a user interface or to one or more controller or controlling software, a warning, an alarm, etc.

The vibrational disfunction classifier 150 obtains a set of displacement, acceleration, and rotational acceleration measurements that reflect drill bit movement in the axial direction 132, the lateral direction 134, and the torsional direction 136. Vibrational measurements occur as a result of drill bit movement during drilling, i.e., both intentional or productive drill bit movement occurring at the drill bit to cause drilling of a wellbore and additional or non-productive vibration induced as a result of intentional drill bit movement. Drill bit movement, in a rotary drill such as a PDC rotary drill bit, occurs in the torsional direction as a result of BHA or drill string rotation and provides the impetus for wellbore creation. The rotational movement of the drill bit creates axial movement of the drill bit as the drill bit enlarges a wellbore and penetrates the geological formation. Other drill bit movement results from axial advancement and torsional drilling, which includes both normal drill bit vibrational behavior and identifiable drill bit vibrational disfunctions. Based on these measurements acquired during drilling, the vibrational disfunction classifier 150 identifies a type of disfunction or normal drilling behavior. Measurements can be optionally divided into time periods or batched, so the vibration disfunction classifier 150 identifies a type of disfunction or normal drilling behavior for each of the time periods. Identified disfunctions can be characterized by general behavior, i.e., stick-slip, high frequency vibrations, backward whirl, etc., and by causes and mitigation methods, i.e., friction-induced, drillpipe-induced, torsional noise, etc. The vibrational disfunction classifier 150 uses a ML model to classify and identify vibrational disfunction, where the ML model has been previously trained by the vibrational disfunction ML model trainer 180.

Once a drilling disfunction type is identified, the identity of the vibrational disfunction occurring (or an identity corresponding to normal drilling behavior) is transmitted to a drilling parameter controller. The drilling parameter controller or operator, because each drilling disfunction type corresponds to a different set of one or more causes, can adjust drilling parameters to mitigate the detected drilling disfunction.

The vibrational disfunction ML model trainer 180 can be located at the surface 104 near the borehole 106 or at another location, such as at a laboratory or testing site. The vibrational disfunction ML model trainer 180 can be operated once for multiple drilling runs, updated after one or more drilling runs with new training data, or operated and adjusted individually for one or more formation or borehole types.

The vibrational disfunction ML model trainer 180 is trained on a set of multiple examples of characteristic drill bit behavior corresponding to each of the vibrational disfunction types. The examples can be short (i.e., approximately 10 seconds) to long (i.e., on the order of minutes) recordings or simulations of drill bit movement and acceleration corresponding to a type of vibrational disfunction or corresponding to normal drilling. Drilling disfunction types are differentiated by displacement, acceleration, or rotational acceleration characteristics, as can be recorded by accelerometers and gyroscopes in a drill bit. Drilling disfunction types with identical characteristics can be identified as belonging to the set of drilling disfunction types with those same characteristics, but this inhibits mitigation of disfunction if the causes of such disfunctions are non-identical.

The vibrational disfunction ML model trainer 180 can be trained on hundreds to thousands of example data sets and can achieve identification accuracy levels approaching 98% or higher. The ML model created by the ML model trainer 180 can be a neural network, convolutional neural network, etc. or other type of model created from a supervised learning algorithm. The vibrational disfunction ML model trainer 180 can be updated with additional types of vibrational disfunction, including examples of characteristic drill bit displacements and accelerations.

Vibrational disfunctions persist for intervals of seconds to entire drilling runs (i.e., hours or days). Very short occurrences of drilling disfunction which resolve themselves do not require adjustment of drilling parameters. The time length of training examples and the time during which the vibrational disfunction classifier samples drill bit movement downhole is selected to optimize drilling—i.e., to identify vibrational drilling disfunction occurrences to be mitigated and to ignore transient disfunctions which self-resolve. The length of training examples can be shorter than the sampling interval of the vibrational disfunction classifier 150.

Figure 2:
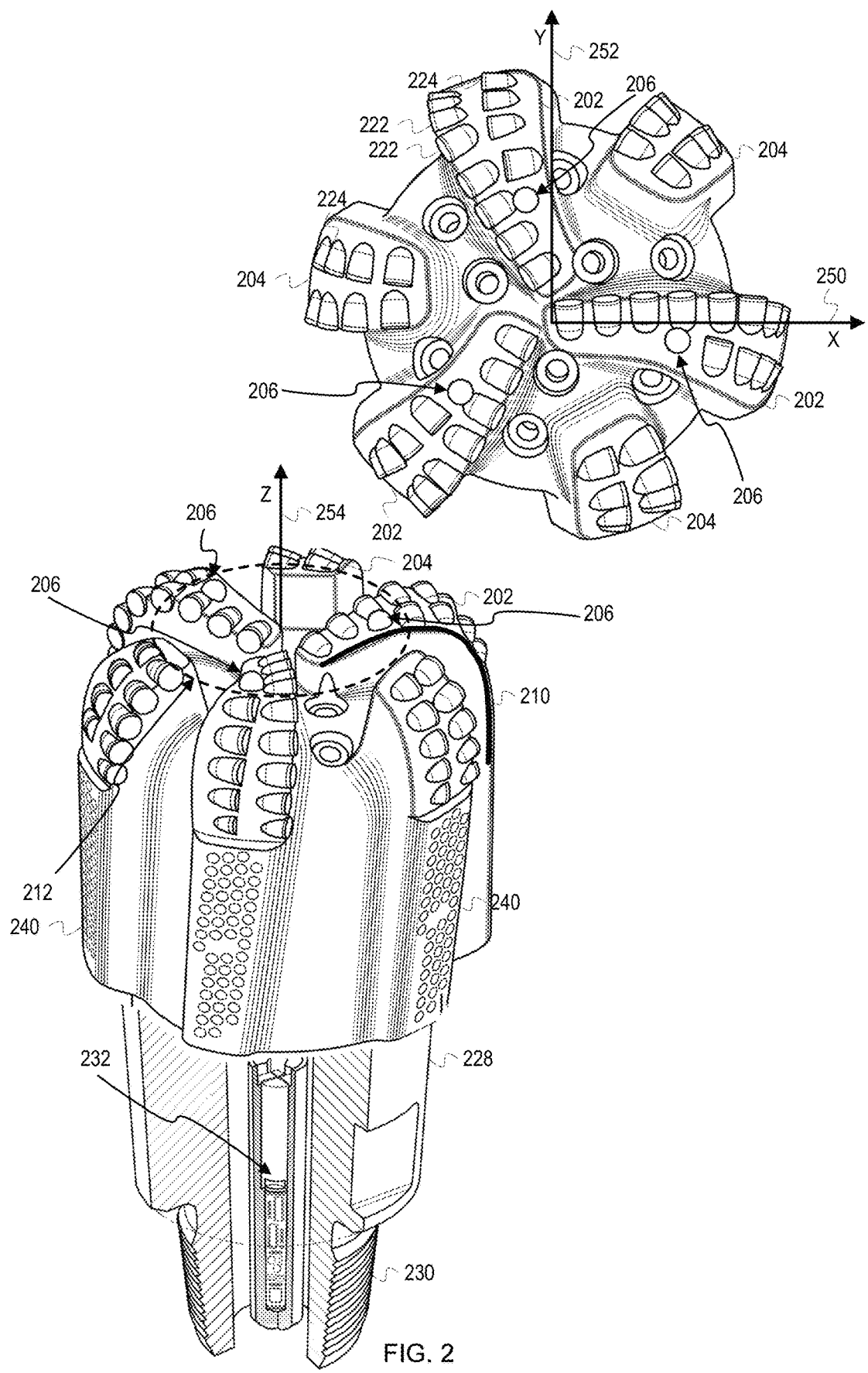
FIG. 2 depicts an example polycrystalline diamond compact (PDC) drill bit with accelerometers and gyroscopes for vibrational disfunction measurements.

FIG. 2 depicts an example polycrystalline diamond compact (PDC) drill bit with accelerometers and gyroscopes for vibrational disfunction measurements. The example PDC drill bit design includes primary blades 202, backup blades 204, depth of cut controllers (DOCCs) 206, primary cutters 222, backup cutters 224, gauge pads, 240, a shank 228, and a pin connection 230. A cone 212 is defined where the drill bit profile 210 curves inward towards the center of the drill bit. The pin connection 230 can be a connector according to any of the specifications of the American Petroleum Institute (API), including an API Specification 7 pin connection, or another equivalent connection type.

An embedded vibrational measurement device 232 comprises circuitry placed within the PDC drill bit, including inside any combination of the shank 228 and the pin connection 230, that measures drill bit vibration. Drill bit vibration can be measured as a function of location (or displacement), velocity, or acceleration (including radial velocity and radial acceleration) by accelerometers and gyroscopes within the vibrational measurement device 232. Alternatively, drill bit vibration can be measured by sensors associated with the drill bit, such as sensors or a vibrational measurement device attached to the drill bit (i.e., either inside or outside of the drill bit), embedded or attached to a portion of the BHA (e.g., attached to or embedded in a reamer, under-reamer, core-barrel, etc.), or attached to or embedded with another portion of one or more drilling tools. Drill bit vibration occurs along axial, lateral, and torsional axes. Axial, lateral, and torsional axes are defined with respect to direction of drilling, or optionally with respect to the wellbore as shown in FIG. 1 and constitute a cylindrical coordinate system. The drill bit can also be described by x-axis 250, y-axis 252, and z-axis 254 in a Cartesian coordinate system. Axial vibrations are detected as changes in at least one of displacement, velocity, or acceleration substantially along the z-axis 254. Lateral and torsional vibrations are detected as changes in at least one of displacement, velocity, or acceleration substantially along the x-axis 250 and the y-axis 252, including exclusively in one axis or in any combination of the two axes. Additionally, a zero point or pole for either system of axis can be chosen with respect to the drill bit, the drill string, the wellbore, the formation, etc.

Vibrational measurements are stored in memory at the PDC bit, where the memory can be located at any point in the bit or BHA or in the vibrational measurement device 232. Vibrational measurements can be retrieved from the vibrational measurement device 232 and logged when the BHA is returned to the surface, such as when acquiring data for the vibrational disfunction ML model trainer 180. Optionally, vibrational measurements may be transmitted to another portion of the BHA for storage, transmitted to another portion of the BHA for transmission to a computer at the surface, or transmitted to a computer at the surface or a drilling controller for real-time analysis of vibrational data.

The vibrational measurement device 232 can further contain a processor, controller, or other memory and software within its circuitry to store and operate the vibrational disfunction classifier 150. Optionally, the vibrational measurement device 232 can transmit vibrational measurements to the vibrational disfunction classifier 150 in another portion of the BHA, to the vibrational disfunction classifier 150 at another location in the wellbore or borehole outside of the BHA (such as at another location on the drill pipe 118), or to the vibrational disfunction classifier 150 at the surface or another location outside of the wellbore.

The vibrational disfunction classifier 150 operates on the vibrational measurements to identify a type of drilling disfunction or to identify normal drilling behavior. The identification determined by the vibrational disfunction classifier 150 is transmitted to the drilling parameter controller. Optionally, the identification is transmitted to the drilling parameter controller at the surface through mud pulse telemetry. The identification can be transmitted via mud pulse telemetry as a 3-bit identifier, where the identifier corresponds to a number zero through eight pre-determined to correspond to at least one type of vibrational behavior classification. The mud pulse telemetry communication can be longer or shorter than three bits, including in cases where more than one vibrational behavior is identified and communicated. The vibrational measurement device 232 can contain a process, controller, or other hardware or software to control a mud pump, such as a mud pump located in the drill string 118, such as at the down hole tool 124, as shown in FIG. 1 or otherwise in communication with the vibrational measurement device 232. Optionally, the vibrational disfunction classifier 150 can be located at the mud pump or between the vibrational measurement device 232 and the mud pump and in communication with both.

The ML model trainer 180 trains the vibrational disfunction classifier 150 with one or more sets of vibrational measurements, such as those recorded by the vibrational measurement device 323. Vibrational measurements for one or more drilling runs or vibrational measurements for one or more time periods from one or more drilling runs are associated with one of eight identified drilling disfunctions or associated with normal drilling behavior. Optionally, normal drilling behavior is identified as the absence of any of the eight identified drilling disfunctions. Each type of drilling disfunction, and optionally normal drilling behavior, is identified by characteristic drill bit behavior—where behavior can include at least one displacement, velocity, and acceleration, including angular, in either a time domain or frequency domain in at least one of the axial direction, the lateral direction, and the torsional directions or along at least one of the x-axis, the y-axis, and the z-axis. Characteristic drill bit behavior can further include angular displacement, angular velocity, and angular acceleration measurements. Characteristic drill bit behavior can be detected in one or more calculation or transform of vibrational measurements such as: a rotational speed (or RPM), a whirl frequency, a backward whirl frequency, and a whirl radius. The whirl frequency, the backward whirl frequency, and the whirl radius can be calculated with respect to a difference between a center of the drill bit and a center of the borehole.

Figure 3:
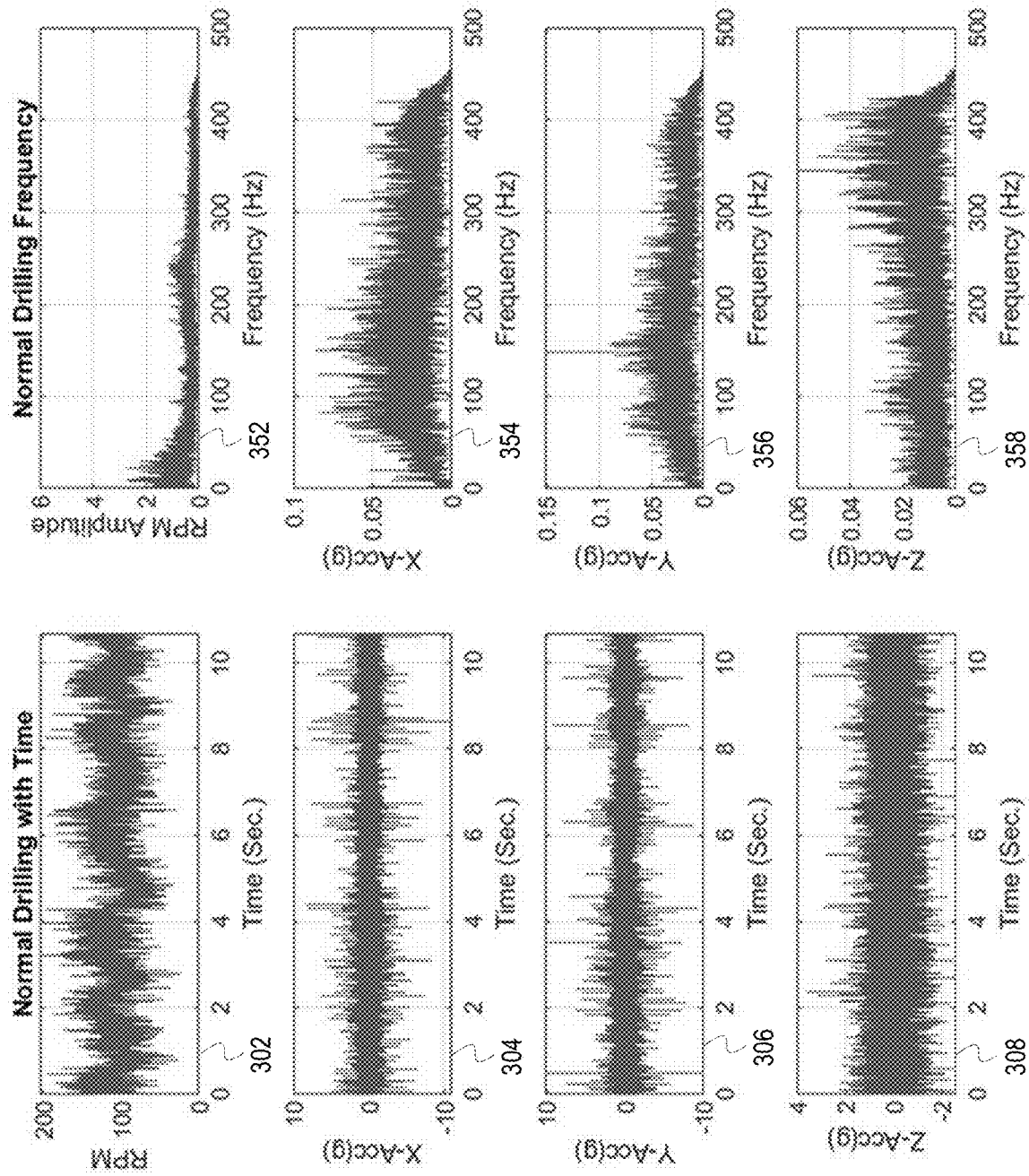
FIG. 3 depicts graphs of example vibrational measurements in different domains associated with normal drilling.

FIG. 3 depicts graphs of example vibrational measurements in different domains associated with normal drilling. FIG. 3 includes graphs 302, 304, 306, and 308 depicting vibrational measurements in the time domain, and graphs 352, 354, 356, and 358 depicting vibrational measurements in the frequency domain. The graphs show measurements obtained at a drill bit for an approximately 11 second (sec) period of a drilling run. The graph 302 depicts RPM as a function of time, while the graphs 304, 306, and 308 depict acceleration in the x, y, and z direction (with respect to the drill bit) as a function of time. Vibrational measurements in the frequency domain, such as those shown in the graphs 352, 354, 356, and 358, are obtained by applying a frequency transform, such as a fast Fourier transform (FFT), to vibrational measurements in the time domain. The graph 352 displays the frequency components of the amplitude of the RPM shown in the graph 302. The graphs 354, 356, and 358 display the frequency components of the acceleration in the x, y, and z directions, respectively, as shown in the graphs 304, 306, and 308.

Normal drilling behavior may be defined as the absence of behavior corresponding to one or more identified drilling disfunction, which will be discussed in more detail in reference to FIGS. 4A-4B, 5A-5B, 6A-6B, 7A-7B, 8A-8B, 9A-9B, 11A-11B, and 12A-12B. Alternatively, normal drilling may be defined as corresponding to vibrational data which indicates relatively constant torsional rotation (as measured in RPMs) and relatively constant displacement, velocity, and acceleration in the x, y, and z directions. Relatively constant is defined as possibly statistically noisy about the mean value, but without significant periods or incidences of displacement, velocity, and acceleration much larger than the mean. Normal drilling produces widely distributed frequencies in each measurement of vibration (e.g., in RPM and in the x, y, and z directions), without dominant frequency signals which correspond to one or more types of drilling disfunction.

Relatively constant values in RPM can be defined as occurring when the difference between maximum RPM and the mean (or average) RPM is no more than twice as large as the mean over the measurement interval, as shown in Eq. 1, below:

$$\frac{\max(RPM) - \text{mean}(RPM)}{\text{mean}(RPM)} < 0.5 \tag{1}$$

where max(RPM) represents the maximum amplitude of the RPM during the measurement interval and mean(RPM) represents the mean amplitude of the RPM over the measurement interval. Optionally, a relationship between mean and outlying values (of RMP or other vibrational measurements) can be defined with respect to a standard deviation, a variance, a mode, or any other measure of variation or dispersion.

Drilling disfunctions are described in relation to both their cause and their mode of BHA behavior. In one or more modes of disfunction, vibrations along two or more axes are coupled or otherwise linked so that disfunction corresponds to characteristic behavior in displacement, velocity, or acceleration along at least one axis which can be reflected in behavior along another axis. In some cases, two or more modes of disfunction can correspond to similar behavior along a primary axis, where the two or more modes are distinguished by different behavior along a secondary axis. Identification of drilling disfunction by both cause and mode of BHA behavior links characteristic drill bit behavior to causality and allows for drilling disfunction mitigation based on identified drilling disfunction.

Figure 4A:
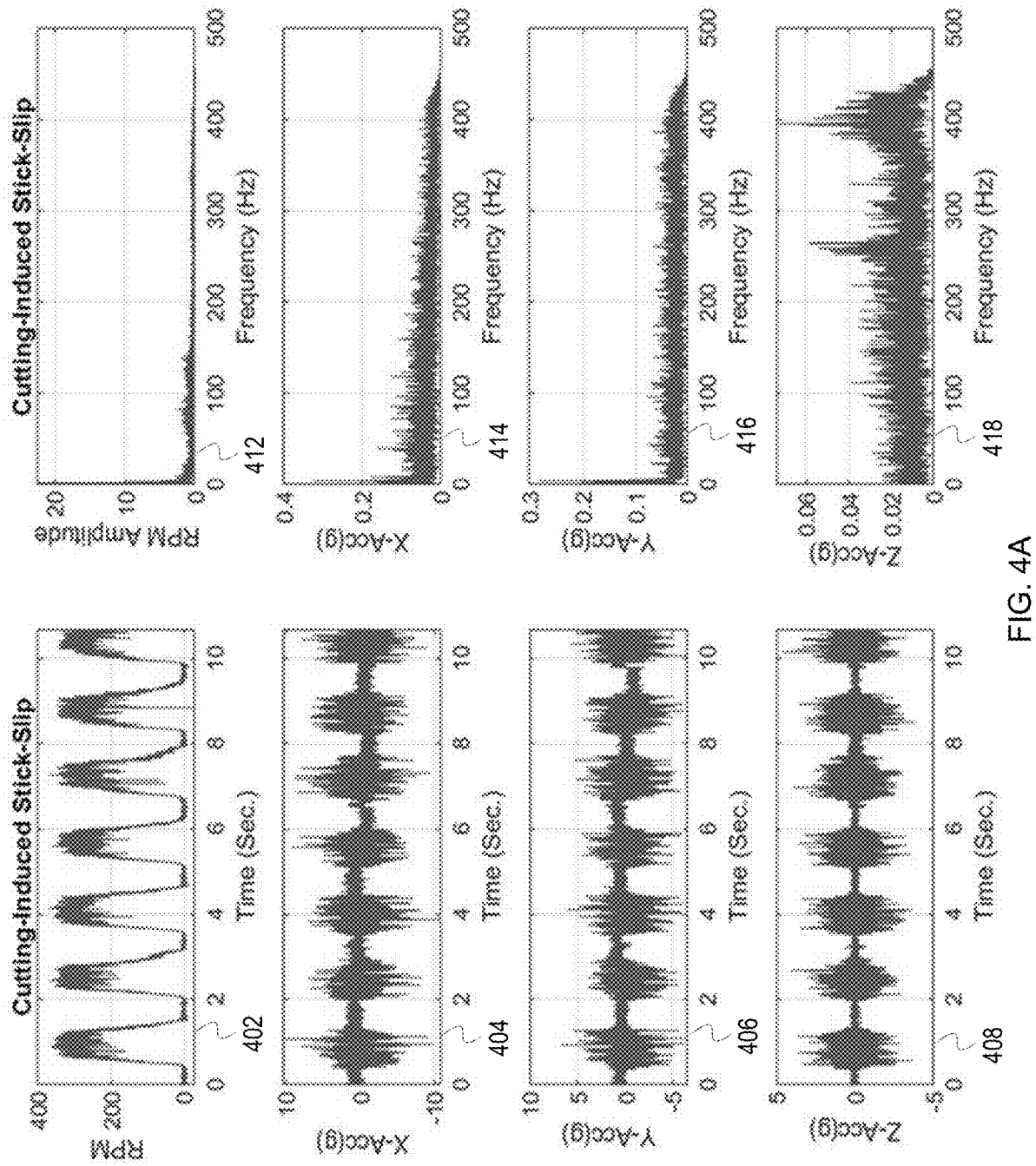
FIGS. 4A and 4B depict graphs corresponding to two example instances of cutting-induced stick slip.
Figure 4B:
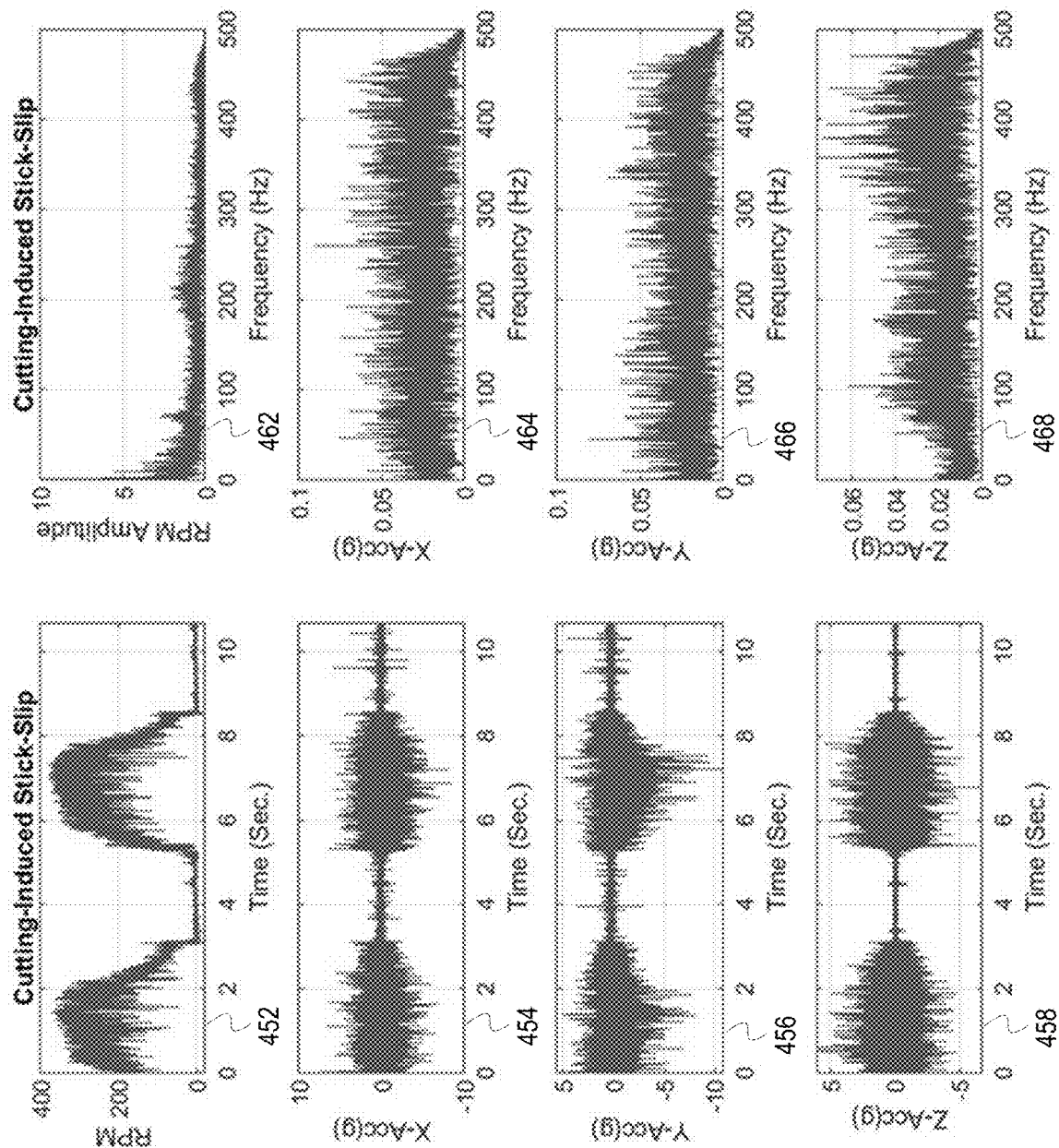

FIGS. 4A and 4B depict graphs corresponding to two example instances of cutting-induced stick slip. FIG. 4A includes graphs 402, 404, 406, and 408 depicting vibrational measurements in the time domain, and graphs 412, 414, 416, and 418 depicting vibrational measurements in the frequency domain. The graphs show measurements obtained at a drill bit for an approximately 11 sec period of a drilling run. The graph 402 depicts RPM as a function of time, while the graphs 404, 406, and 408 depict acceleration in the x, y, and z direction (with respect to the drill bit) as a function of time. Vibrational measurements in the frequency domain, such as those shown in the graphs 412, 414, 416, and 418, are obtained by applying an FFT to the vibrational measurements in the time domain. The graph 412 displays the frequency components of the amplitude of the RPM shown in the graph 402. The graphs 414, 416, and 418 displays the frequency components of the acceleration in the x, y, and z directions, respectively, as shown in the graphs 404, 406, and 408.

FIG. 4B includes graphs 452, 454, 456, and 458 depicting vibrational measurements in the time domain, and graphs 462, 464, 466, and 468 depicting vibrational measurements in the frequency domain. The graphs show measurements obtained at a drill bit for an approximately 11 sec period of a drilling run. The graph 452 depicts RPM as a function of time, while the graphs 454, 456, and 458 depict acceleration in the x, y, and z direction (with respect to the drill bit) as a function of time. Vibrational measurements in the frequency domain, such as those shown in the graphs 462, 464, 466, and 468, are obtained by applying an FFT to vibrational measurements in the time domain. The graph 462 displays the frequency components of the amplitude of the RPM shown in the graph 452. The graphs 464, 466, and 468 displays the frequency components of the acceleration in the x, y, and z directions, respectively, as shown in the graphs 454, 456, and 458.

Stick-slip can be defined as a drilling disfunction in which periods of rotation (i.e., where RPM>0 or the slip phase) alternate with periods of approximately zero rotation (i.e., where RPM~0 or the stick phase). Cutting-induced stick-slip and friction-induced stick slip have different causes and have both similar characteristic behavior (e.g., stick-slip) in rotation or the torsional direction) and different characteristic behaviors in one or more other directions.

For cutting-induced stick-slip, the stick-slip behavior in the torsional direction manifests as periods of high RPM and periods of approximately zero RPM. Stick-slip behavior corresponds to a measurement interval in which the maximum RPM is greater than twice the mean RPM, or a measurement interval which satisfies the conditions of Eq. 2, below:

$$\frac{\max(RPM) - \text{mean}(RPM)}{\text{mean}(RPM)} \geq 1.0 \tag{2}$$

Further, cutting-induced stick exhibits negligible vibration in the axial or z-axis direction during stick phases (i.e., when RPM~0).

The graphs of both FIGS. 4A and 4B exhibit the behaviors characteristic of cutting-induced stick slip. In FIG. 4A, stick phases last approximately 0.5 sec, while slip phases last approximately 1 sec, which a period of stick and slip phases of approximately 1.5 sec. In FIG. 4B, stick phases last approximately 2 sec while slip phases last approximately 5 sec. Stick and slip phases can be regularly occurring, where a frequency of stick and slip phases can be characteristic of the interaction between the drill bit and at least one formation face of the borehole. Stick and slip phases can exhibit resonant or harmonic oscillation in which torsion of the drill pipe functions as a harmonic oscillator or spring. In some cases, stick and slip phases alternate irregularly or begin and end abruptly. In both FIGS. 4A and 4B, stick phases in RPM correspond to periods in which the axial acceleration is also negligible. This corresponds to no axial vibration occurring—which is approximately stick occurring across both the axial and torsional axes.

Figure 5A:
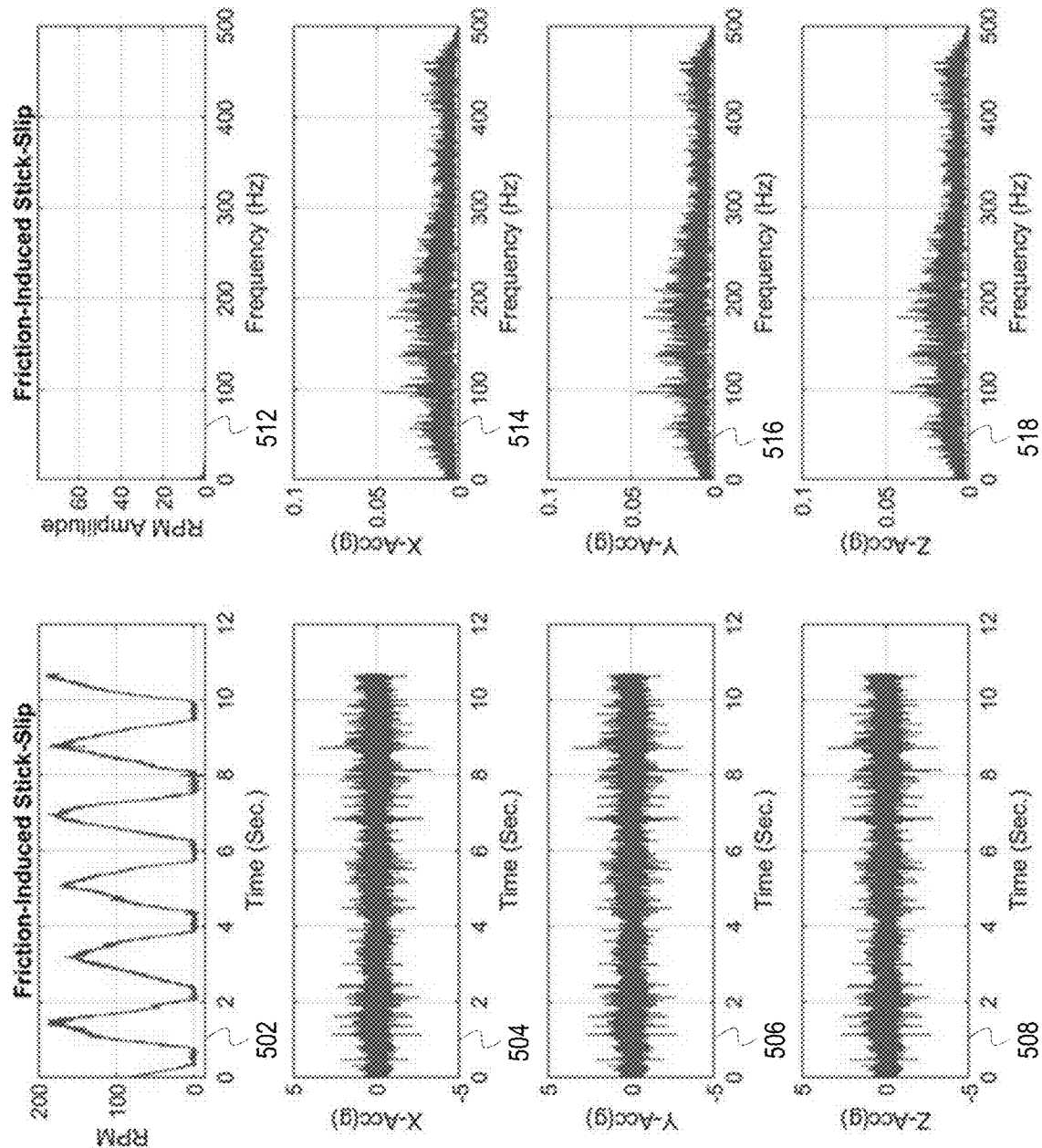
FIGS. 5A and 5B depict graphs corresponding to two example instances of friction-induced stick slip.
Figure 5B:
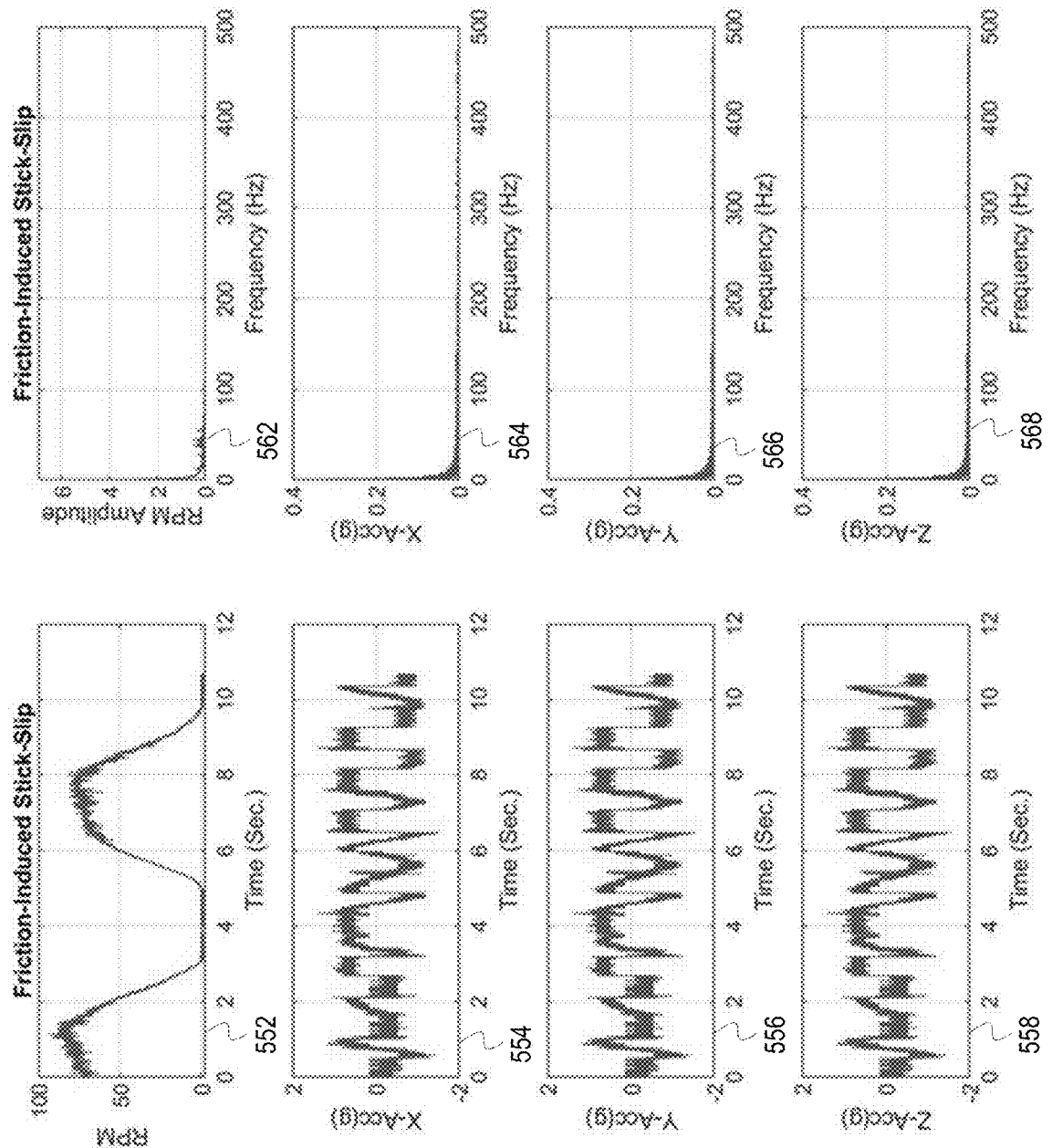

FIGS. 5A and 5B depict graphs corresponding to two example instances of friction-induced stick slip. FIG. 5A includes graphs 502, 504, 506, and 508 depicting vibrational measurements in the time domain, and graphs 512, 514, 516, and 518 depicting vibrational measurements in the frequency domain. The graphs show measurements obtained at a drill bit for an approximately 10 sec period of a drilling run. The graph 502 depicts RPM as a function of time, while the graphs 504, 506, and 508 depict acceleration in the x, y, and z direction (with respect to the drill bit) as a function of time. Applying a FFT to the vibrational measurements in the frequency domain (i.e., the data of the graphs 502, 504, 506, and 508), produces the frequency domain vibrational measurements shown in the graphs 512, 514, 516, and 518, respectively.

FIG. 5B includes graphs 552, 554, 556, and 558 depicting vibrational measurements in the time domain, and graphs 562, 564, 566, and 568 depicting vibrational measurements in the frequency domain. The graphs show measurements obtained at a drill bit for an approximately 10 sec period of a drilling run. The graph 552 depicts RPM as a function of time, while the graphs 554, 556, and 558 depict acceleration in the x, y, and z direction (with respect to the drill bit) as a function of time. Vibrational measurements in the frequency domain, such as those shown in the graphs 562, 564, 566, and 568, are obtained by applying an FFT to vibrational measurements in the time domain (i.e., the data shown in the graphs 552, 554, 556, and 558, respectively).

For friction-induced stick-slip, the stick-slip behavior in the torsional direction manifests as periods of high RPM and periods of approximately zero RPM, which satisfy the conditions of Eq. 2. However, friction-induced stick exhibits non-negligible vibration in the axial or z-axis direction during stick phases. Further, the axial vibration is independent of the stick or slip phase of the RPM or in torsional vibration.

The graphs of both FIGS. 5A and 5B exhibit the behaviors characteristic of friction-induced stick slip. In FIG. 5A, stick phases last approximately 0.5 sec, while slip phases last approximately 1.5 sec, where RPM during the slip phases increases and decreases but does not reach a steady state value. In FIG. 5B, stick phases last approximately 2 sec and slip phases last approximately 2 sec. Stick and slip phases for friction-induced stick-slip can exhibit resonant frequencies, harmonic oscillation, or irregularity, in the same manner of the stick and slip phases of cutting-induced stick-slip. In both FIGS. 5A and 5B, stick phases in RPM correspond to periods in which the axial acceleration is also non-negligible. In FIG. 5A, the axial acceleration of the graph 508 is relatively constant and similar in appearance to the axial acceleration of the graph 308, which corresponds to normal drilling. In FIG. 5B, the axial acceleration of the graph 558 is similar to the x and y acceleration of the graphs 554 and 556, where periods of acceleration occur at positive values, negative values, and values near zero. The graphs 554, 556, and 558 exhibit behavior uncorrelated to the stick and slip phases of the graph 552.

Figure 6A:
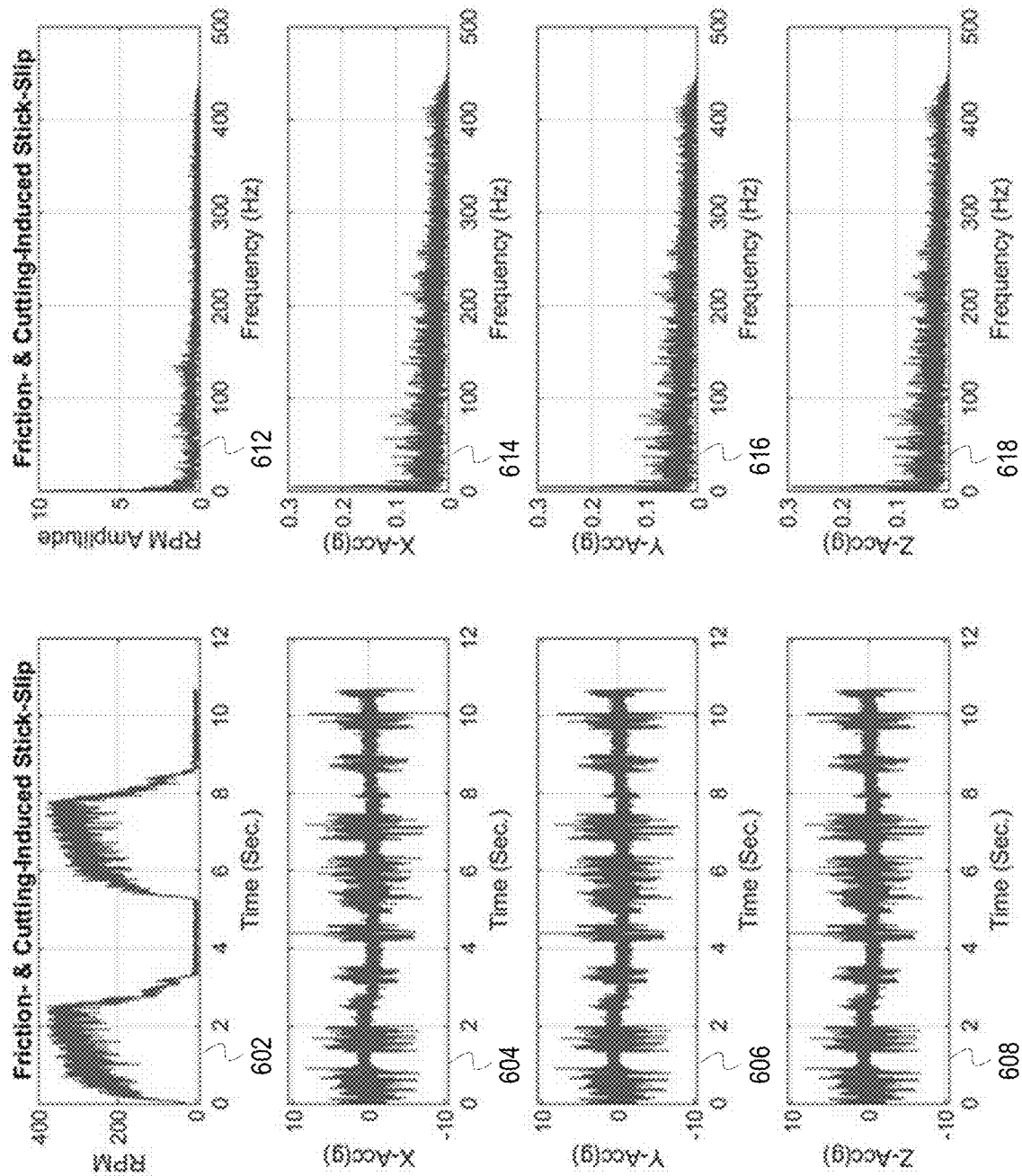
FIGS. 6A and 6B depict graphs corresponding to two example instances of friction-and-cutting-induced stick slip.
Figure 6B:
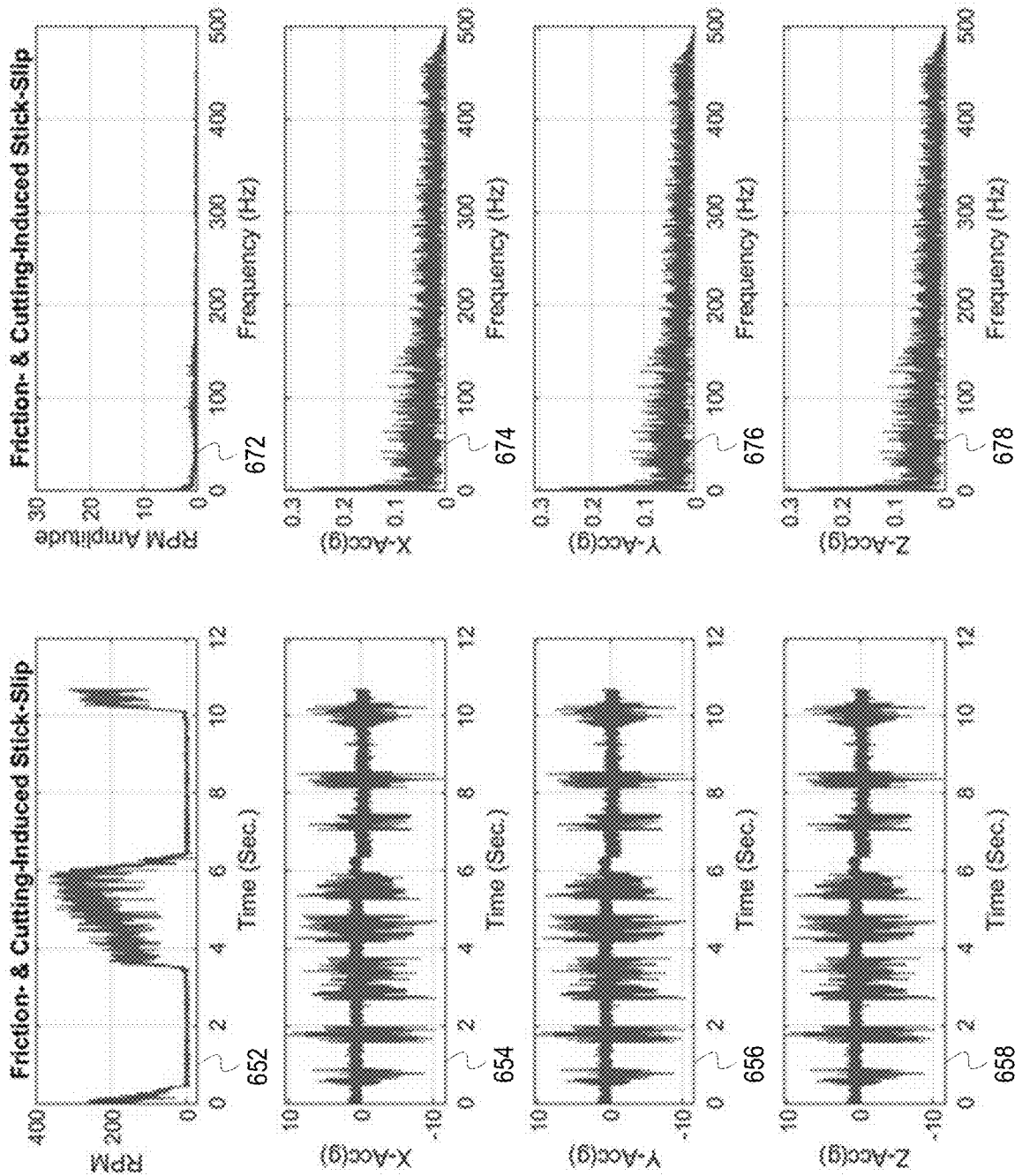

FIGS. 6A and 6B depict graphs corresponding to two example instances of friction-and-cutting-induced stick slip. FIG. 6A includes graphs 602, 604, 606, and 608 depicting vibrational measurements in the time domain, and graphs 612, 614, 616, and 618 depicting vibrational measurements in the frequency domain. The graphs show measurements obtained at a drill bit for an approximately 10 sec period of a drilling run. The graph 602 depicts RPM as a function of time, while the graphs 604, 606, and 608 depict acceleration in the x, y, and z direction (with respect to the drill bit) as a function of time. Applying a FFT to the vibrational measurements in the frequency domain (i.e., the data of the graphs 602, 604, 606, and 608), produces the frequency domain vibrational measurements shown in the graphs 612, 614, 616, and 618, respectively.

FIG. 6B includes graphs 652, 654, 656, and 658 depicting vibrational measurements in the time domain, and graphs 672, 674, 676, and 678 depicting vibrational measurements in the frequency domain. The graphs show measurements obtained at a drill bit for an approximately 10 sec period of a drilling run. The graph 652 depicts RPM as a function of time, while the graphs 654, 656, and 658 depict acceleration in the x, y, and z direction (with respect to the drill bit) as a function of time. Vibrational measurements in the frequency domain, such as those shown in the graphs 672, 674, 676, and 678, are obtained by applying an FFT to vibrational measurements in the time domain (i.e., the data shown in the graphs 652, 654, 656, and 658, respectively).

For friction-and-cutting-induced stick-slip, the stick-slip behavior in the torsional direction manifests as periods of high RPM and periods of approximately zero RPM, which satisfy the conditions of Eq. 2. Friction-and-cutting-induced stick-slip exhibits periods or instances of both negligible and non-negligible vibration in the axial or z-axis direction during stick phases. That is, friction-and-cutting-induced stick-slip exhibits axial acceleration characteristic of both friction-induced and cutting-induced stick-slip drilling dysfunctions. The acceleration in the axial direction is not independent of the behavior of the stick or slip phase in the RPM or of the torsional vibration.

The graphs of both FIGS. 6A and 6B exhibit the behaviors characteristic of friction-and-cutting-induced stick slip. In FIG. 6A, stick phases last approximately 2 sec, while slip phases last approximately 3 sec. In FIG. 6B, stick phases last approximately 2.25 sec and slip phases last approximately 4 sec. Stick and slip phases for friction-and-cutting-induced stick-slip can exhibit resonant frequencies, harmonic oscillation, or irregularity, in the same manner of the stick and slip phases of both cutting-induced stick-slip and friction-inducted stick-slip. In both FIGS. 6A and 6B, stick phases in RPM correspond to periods in which the axial acceleration is both negligible and non-negligible. In FIG. 6A, the axial acceleration of the graph 608 is similar to the x and y acceleration of the graphs 604 and 606, with intermittent periods of measurable acceleration and periods of negligible acceleration. Likewise, in FIG. 6B the axial acceleration of the graph 658 is similar to the x and y acceleration of the graphs 654 and 656, with corresponding periods of minimal acceleration and significant acceleration. The graphs 608 and 658 exhibit behavior uncorrelated to the stick and slip phases of the graphs 602 and 652, respectively.

Figure 7A:
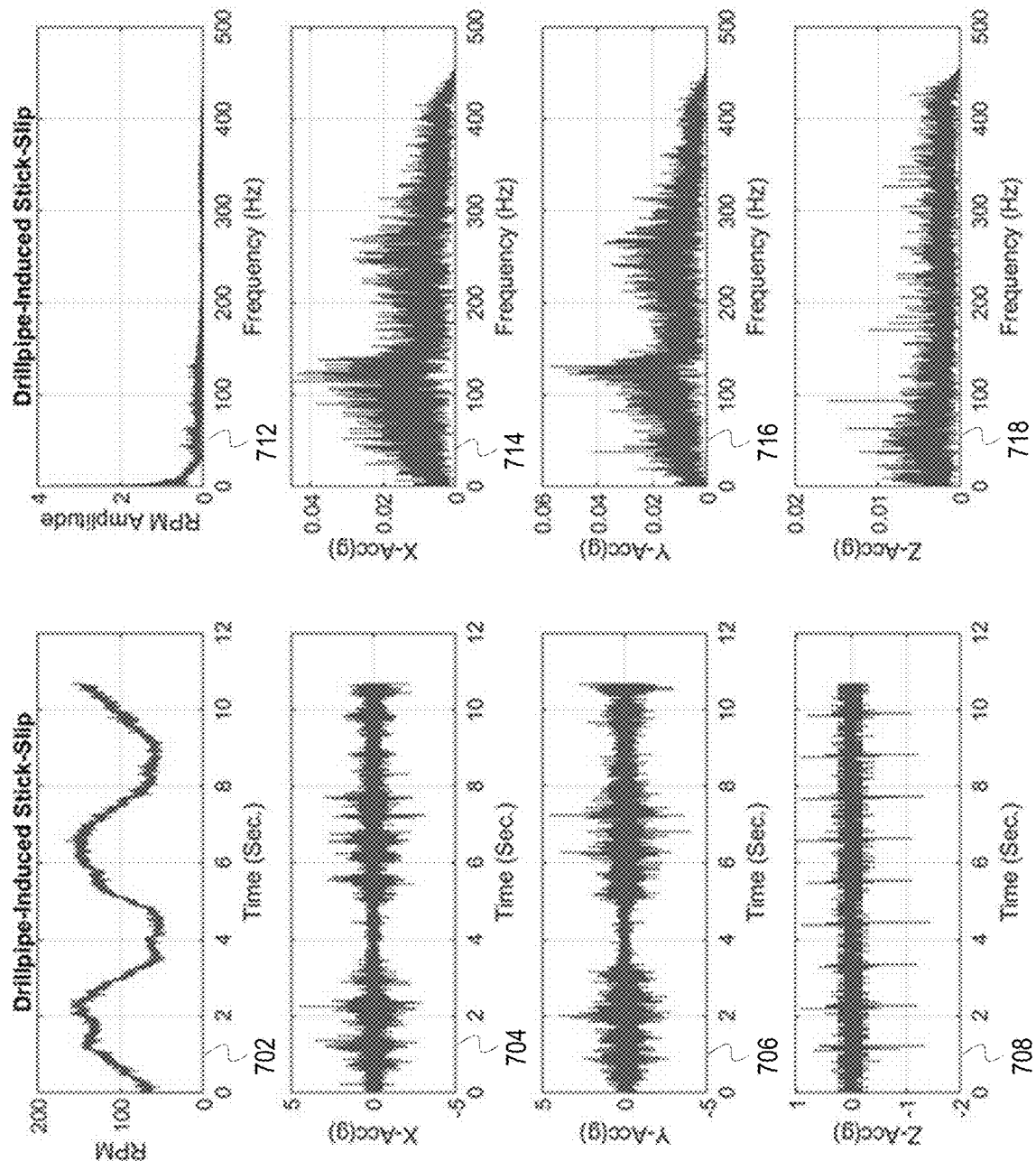
FIGS. 7A and 7B depict graphs corresponding to two example instances of drillpipe-induced stick slip.
Figure 7B:
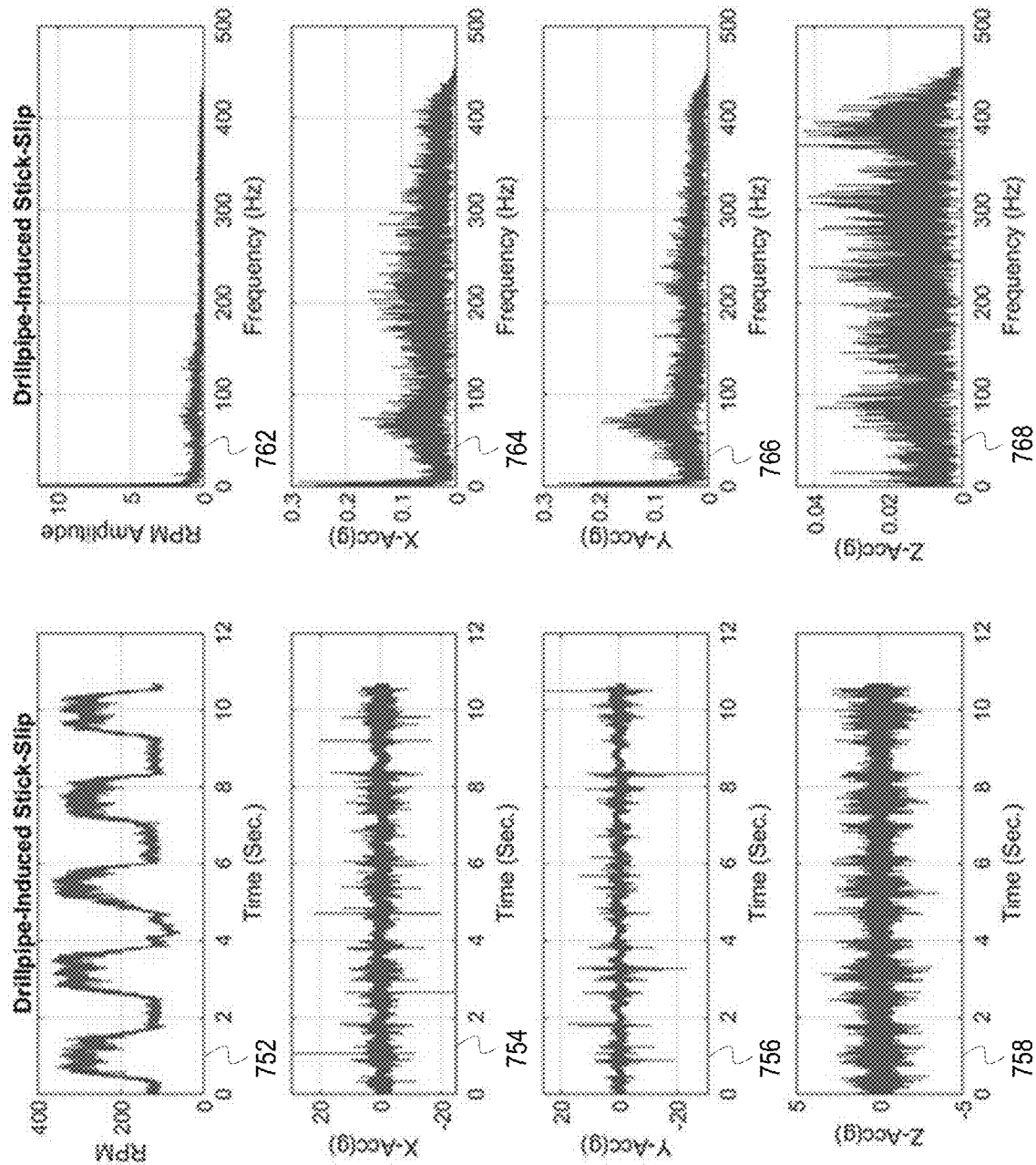

FIGS. 7A and 7B depict graphs corresponding to two example instances of drillpipe-induced stick slip. FIG. 7A includes graphs 702, 704, 706, and 708 depicting vibrational measurements in the time domain, and graphs 712, 714, 716, and 718 depicting vibrational measurements in the frequency domain. The graphs show measurements obtained at a drill bit for an approximately 11 sec period of a drilling run. The graph 702 depicts RPM as a function of time, while the graphs 704, 706, and 708 depict acceleration in the x, y, and z direction (with respect to the drill bit) as a function of time. Applying a FFT to the vibrational measurements in the frequency domain (i.e., the data of the graphs 702, 704, 706, and 708), produces the frequency domain vibrational measurements shown in the graphs 712, 714, 716, and 718, respectively.

FIG. 7B includes graphs 752, 754, 756, and 758 depicting vibrational measurements in the time domain, and graphs 762, 764, 766, and 768 depicting vibrational measurements in the frequency domain. The graphs show measurements obtained at a drill bit for an approximately 11 sec period of a drilling run. The graph 752 depicts RPM as a function of time, while the graphs 754, 756, and 758 depict acceleration in the x, y, and z direction (with respect to the drill bit) as a function of time. Vibrational measurements in the frequency domain, such as those shown in the graphs 762, 764, 766, and 768, are obtained by applying an FFT to vibrational measurements in the time domain (i.e., the data shown in the graphs 752, 754, 756, and 758, respectively).

For drillpipe-induced stick-slip, the stick-slip behavior in the torsional direction manifests as periods of high RPM and periods of approximately lower but non-zero RPM. Drillpipe-induced stick-slip occurs when a region of the drillpipe or BHA experiences stick-slip. Periods of high RPM (corresponding to a slip phase at the point of disfunction) and periods of low RPM (corresponding to a stick phase at the point of disfunction) are observed at the drill bit, which itself does not experience a stick phase. The period of low RPM detected at the drill bit can be a quasi-stick phase. Drillpipe-induced stick exhibits non-negligible vibration in the axial or z-axis direction during stick phases. Further, the axial vibration is independent of the stick or slip phase of the RPM or in torsional vibration.

The graphs of both FIGS. 7A and 7B exhibit the behaviors characteristic of drillpipe-induced stick-slip. In FIG. 7A, slip phases last approximately 2 sec with a maximum RPM of approximately 150 revolutions per minutes (rev/min), while quasi-stick phases last approximately 1 sec with an RPM of approximately 50 rev/min. In FIG. 7B, stick phases last approximately 1 sec at an RPM of approximately 100 rev/min and slip phases last approximately 1 sec at a maximum RPM of approximately 350 rev/min. Stick and slip phases for drillpipe-induced stick-slip can exhibit resonant frequencies, harmonic oscillation, or irregularity, in the same manner of the stick and slip phases of cutting-induced, friction-induced, and cutting-and-friction-induced modes of stick-slip. In both FIGS. 7A and 7B, stick phases in RPM correspond to periods in which the axial acceleration is also non-negligible. In FIG. 7A, the axial acceleration of the graph 708 is relatively constant and periodic—at a frequency other than the frequency at which stick and slip phases occur. The graphs 704 and 706 exhibit correlation to each other and minor correspondence to the stick and slip phases of the graph 702. In FIG. 7B, the axial acceleration of the graph 758 is noisy and centered about the zero axis, exhibiting no characteristics at the frequency of the stick and slip phase occurrence. The graphs 754, 756, and 758 also exhibit behavior uncorrelated to the stick and slip phases of the graph 752.

Figure 8A:
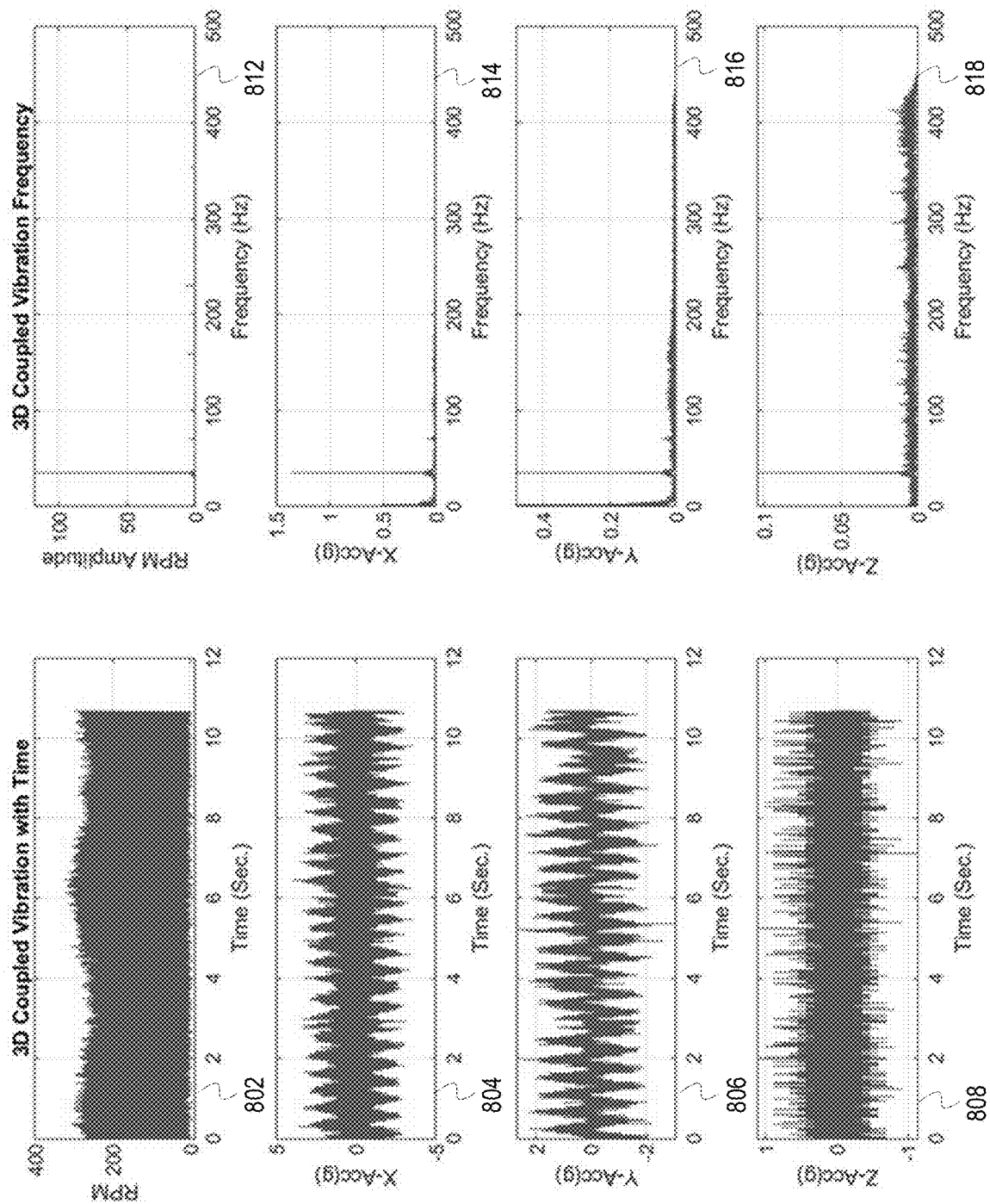
FIGS. 8A and 8B depict graphs corresponding to two example instances of three-dimensional coupled vibrations.
Figure 8B:
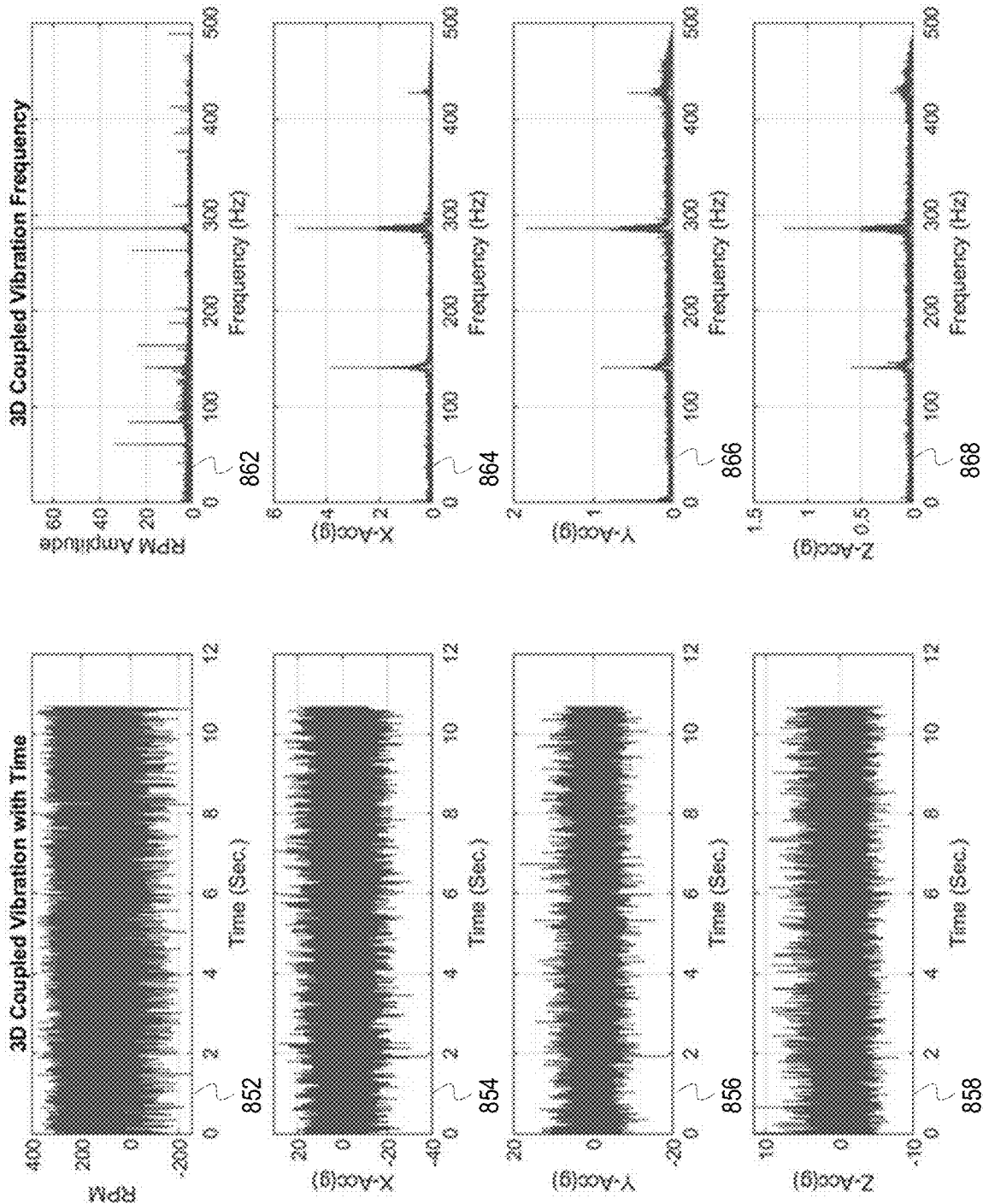

FIGS. 8A and 8B depict graphs corresponding to two example instances of three-dimensional coupled vibrations. FIG. 8A includes graphs 802, 804, 806, and 808 depicting vibrational measurements in the time domain, and graphs 812, 814, 816, and 818 depicting vibrational measurements in the frequency domain. The graphs show measurements obtained at a drill bit for an approximately 11 sec period of a drilling run. The graph 802 depicts RPM as a function of time, while the graphs 804, 806, and 808 depict acceleration in the x, y, and z direction (with respect to the drill bit) as a function of time. Applying a FFT to the vibrational measurements in the frequency domain (i.e., the data of the graphs 802, 804, 806, and 808), produces the frequency domain vibrational measurements shown in the graphs 812, 814, 816, and 818, respectively.

FIG. 8B includes graphs 852, 854, 856, and 858 depicting vibrational measurements in the time domain, and graphs 862, 864, 866, and 868 depicting vibrational measurements in the frequency domain. The graphs show measurements obtained at a drill bit for an approximately 11 sec period of a drilling run. The graph 852 depicts RPM as a function of time, while the graphs 854, 856, and 858 depict acceleration in the x, y, and z direction (with respect to the drill bit) as a function of time. Vibrational measurements in the frequency domain, such as those shown in the graphs 862, 864, 866, and 868, are obtained by applying an FFT to vibrational measurements in the time domain (i.e., the data shown in the graphs 852, 854, 856, and 858, respectively).

Three-dimensional coupled vibrations arise as a result of harmonic oscillations in at least one of the drill bit, the BHA, or the drillpipe. One or more resonant frequencies can be excited by interaction between the formation and the drill bit, BHA, etc. The one or more resonant frequencies generate corresponding vibration at the same frequency, due to non-linearity of the BHA, in the other axes (i.e., axial, lateral, and torsional). Vibrations may be coupled across two or more axes, where strong frequency components occurring across the two or more axes at the same frequency is indicative of cross-axial coupling. Three-dimensional coupled vibrations manifest as periods which satisfy the criteria of Eq. 2 (e.g., where the maximum value of RPM is at least twice the mean RPM), and where high frequency vibrations occur substantially simultaneously in RPM and in the x, y, and z directions. For three-dimensional coupled vibrations, high frequency is defined as greater than 5 Hz. Substantially simultaneous vibrations can be detected based on the occurrence of peaks or local maximums in the frequency components of vibrations for one or more axes. Peaks occurring at frequencies within a margin of error (e.g., 1% of frequency value) on different axes can be determined to be substantially simultaneous.

The graphs of both FIGS. 8A and 8B exhibit the behaviors characteristic of three-dimensional coupled vibrations. In FIG. 8A, the graph 802 displays RMP in the time domain with large variation—RPM values vary between 0 and 300 rev/min. In the frequency domain, the graphs 812, 814, 816, and 818 display peaks or local maxima (also global maxima for this example) at a frequency of approximately 42 Hz. In FIG. 8B, the graph 852 displays RMP as a noisy signal with large dispersion and no identifiable mode value. The graphs 854, 856, and 858 also display noisy accelerations signals. In the frequency domain, each of the graphs 862, 864, 866, and 868 displays a local maximum (and a global maximum) at approximately 290 Hz. Further, the graphs 864, 866, and 866 display a satellite peak at half the frequency of the global maximum, i.e., approximately 145 Hz. The satellite peak is characteristic of excitation of a resonant frequency, where harmonic oscillation at a first period also excited oscillation at two times the harmonic period (or one half the resonant frequency).

Figure 9A:
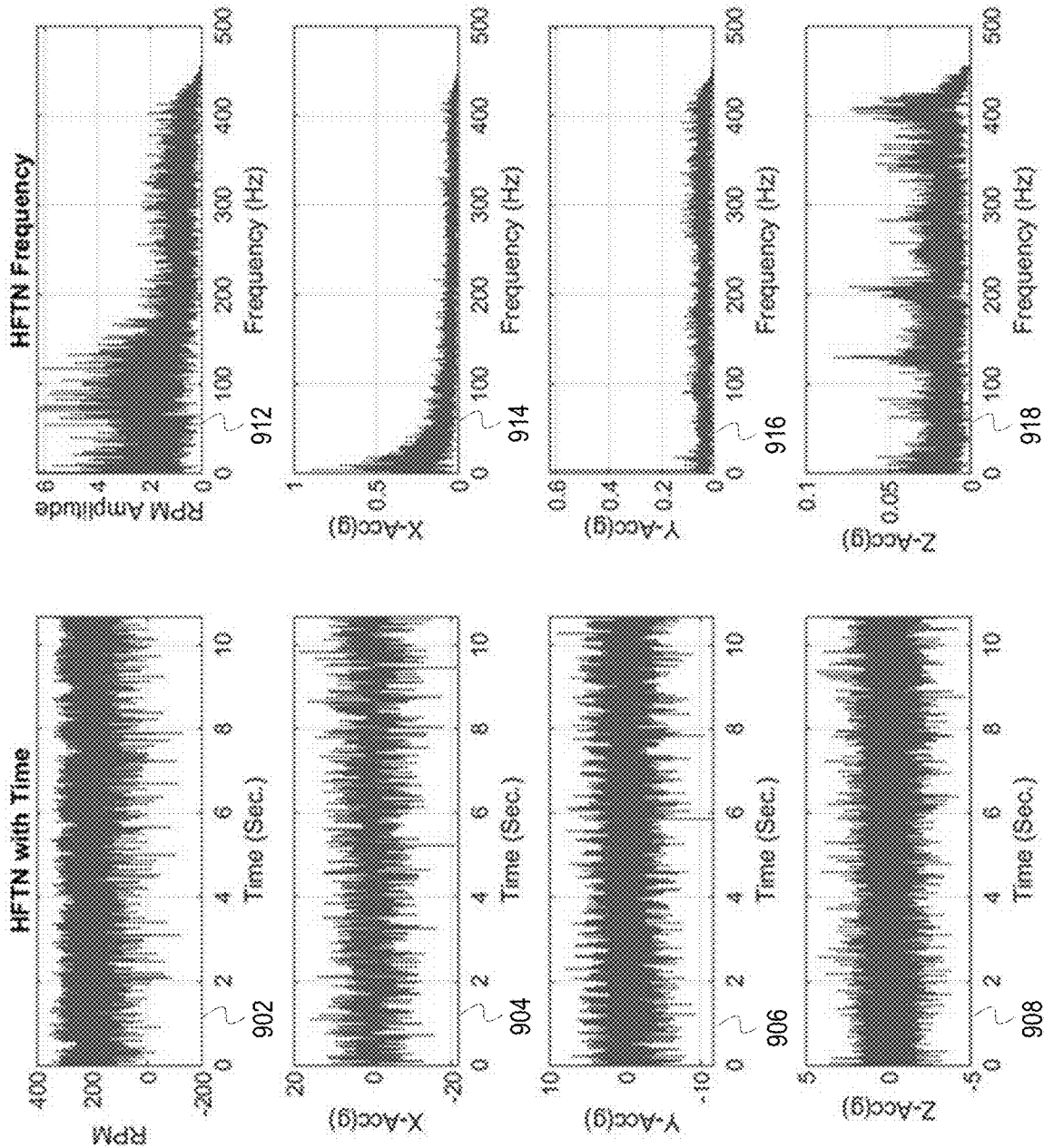
FIGS. 9A and 9B depict graphs corresponding to two example instances of high frequency torsional noise.
Figure 9B:
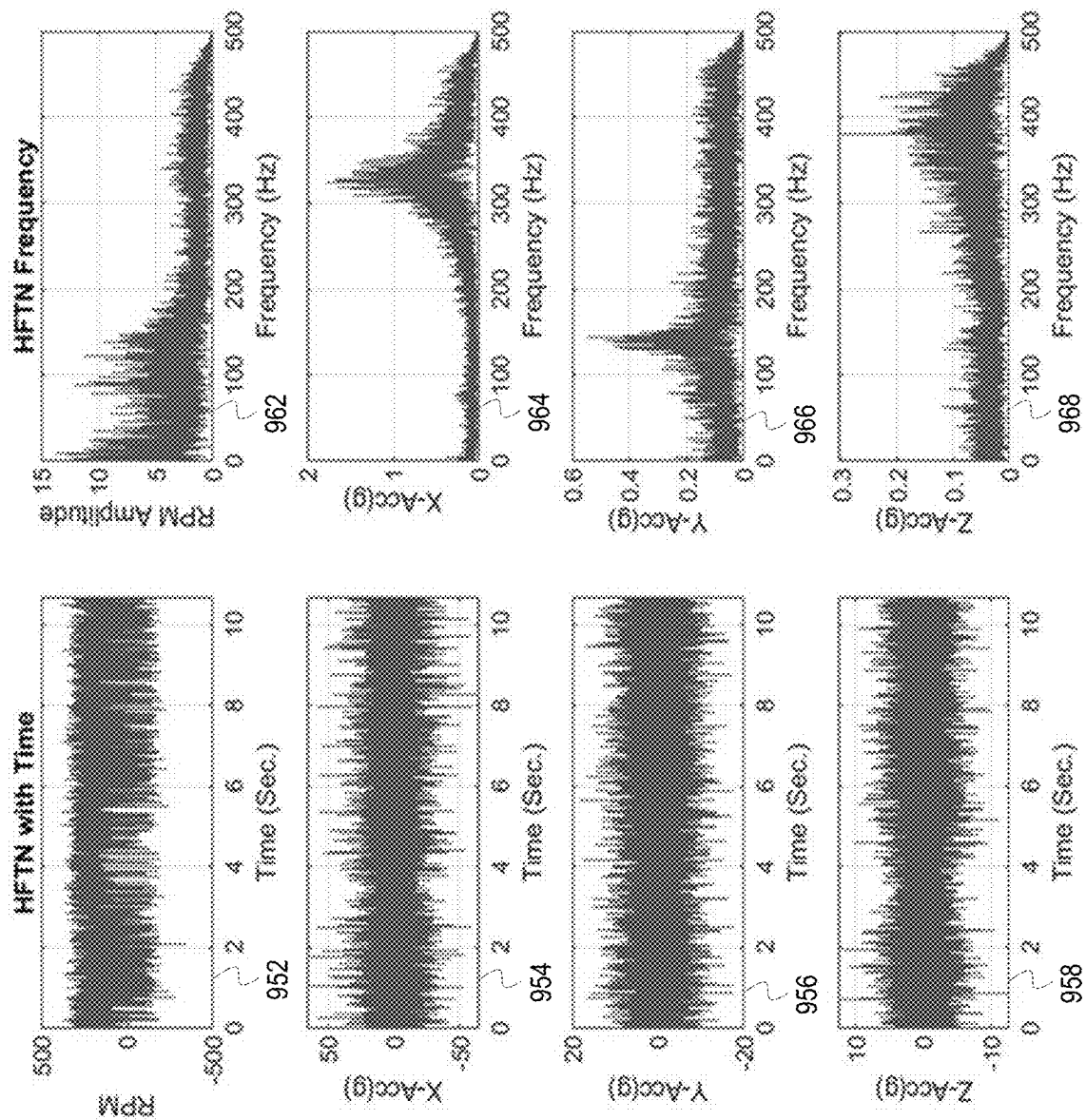

FIGS. 9A and 9B depict graphs corresponding to two example instances of high frequency torsional noise. FIG. 9A includes graphs 902, 904, 906, and 908 depicting vibrational measurements in the time domain, and graphs 912, 914, 916, and 918 depicting vibrational measurements in the frequency domain. The graphs show measurements obtained at a drill bit for an approximately 10 sec period of a drilling run. The graph 902 depicts RPM as a function of time, while the graphs 904, 906, and 908 depict acceleration in the x, y, and z direction (with respect to the drill bit) as a function of time. Applying a FFT to the vibrational measurements in the frequency domain (i.e., the data of the graphs 902, 904, 906, and 908), produces the frequency domain vibrational measurements shown in the graphs 912, 914, 916, and 918, respectively.

FIG. 9B includes graphs 952, 954, 956, and 958 depicting vibrational measurements in the time domain, and graphs 962, 964, 966, and 968 depicting vibrational measurements in the frequency domain. The graphs show measurements obtained at a drill bit for an approximately 10 sec period of a drilling run. The graph 952 depicts RPM as a function of time, while the graphs 954, 956, and 958 depict acceleration in the x, y, and z direction (with respect to the drill bit) as a function of time. Vibrational measurements in the frequency domain, as shown in the graphs 962, 964, 966, and 968, are obtained by applying an FFT to vibrational measurements in the time domain (i.e., the data shown in the graphs 952, 954, 956, and 958, respectively).

High frequency torsional noise (HFTN) occurs in at least the torsional direction and may occur across one or more other axis as high frequency coupled vibrations. HFTN manifest as periods which satisfy the criteria of Eq. 2 (e.g., where the maximum value of RPM is at least twice the mean RPM), where the frequency components of the RMP are widely distributed, and where negative RPM is detected. In the frequency domain, the RMP signal displays no dominant frequency component, but rather multiple or a range of frequencies contribute substantially equally. Negative RPM, as measured in the time domain, is a function of the noisy-ness of the torsional rotation and characteristic of HFTN.

The graphs of both FIGS. 9A and 9B exhibit the behaviors characteristic of three-dimensional coupled vibrations. In FIG. 9A, the graph 902 includes multiple instances of negative RPM values. The graph 912 shows significant contributions to the RPM signal from frequency components in the 0 to 150 Hz range, with further contributions to RPM signal from all frequencies below 400 Hz. In FIG. 9B, the graph 952 includes multiple instances of negative RPM values, where RMP displays significant variance between 0 and approximately 400 rev/min. The graph 962 shows significant contributions to the RPM signal from frequency components close to 0 Hz and between 0 and 150 Hz, with further contributions from frequencies below 500 Hz.

Figure 10:
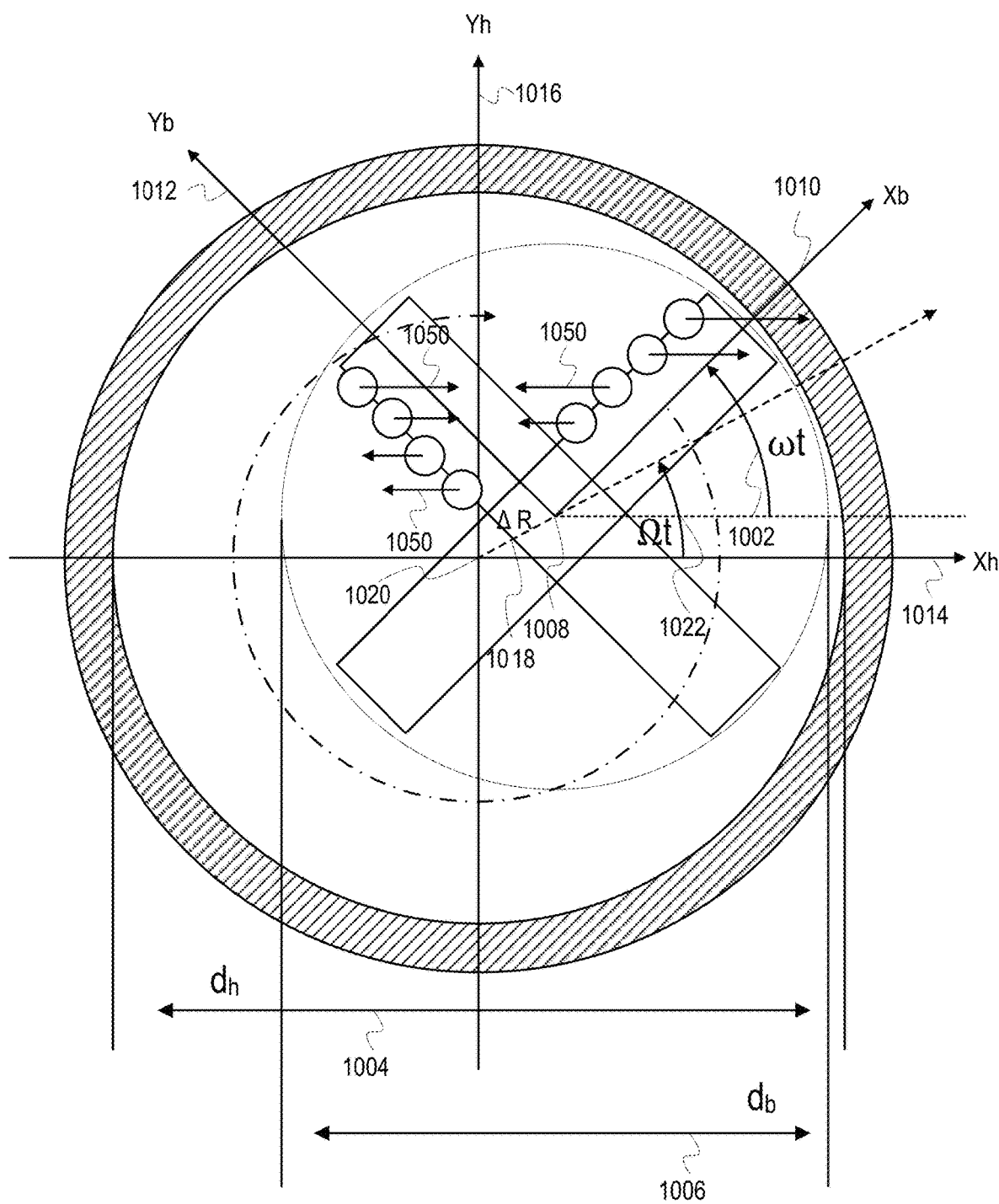
FIG. 10 illustrates calculations of bit whirl radius, frequency, and index.

FIG. 10 illustrates calculations of bit whirl radius, frequency, and index. Bit whirl frequency for a bottom hole assembly (BHA) can be calculated from a bit rotational frequency $\omega_b$ (shown as angular frequency $\omega$ 1002) and a slip related dimensionless constant, k, as shown below:

$$\Omega_{bha} = -k\omega_b \frac{d_h}{(d_h - d_b)} \quad (3)$$

where $d_h$ is the hole diameter 1004, $d_b$ is the BHA or bit diameter 1006, and where k≤1.

An experimentally determined relationship between the number of blades of a PDC bit, and the number of lobes of a backward whirl pattern is shown below:

$$M = jN_b + 1 \quad (4)$$

where M is the number of lobes and where the number of lobes is a measure of a relationship between bit whirl frequency and the bit rotational frequency. M is the number of times the bit contacts, hits, or bounces off the borehole wall in each bit revolution.

Further, j is an integer and j≥1, and $N_b$ is the number of blades of the PDC bit. Lower values of j correspond to higher backward whirl—e.g. j=1 or j=2 correspond to severe backward whirl. The bit whirl frequency $\Omega_{bit}$ is therefore also given by $$\Omega_{bit} = -\omega_b(jN_b + 1) \quad (5)$$

where in most cases j=1.

Calculation of bit whirl index, bit radius, and bit frequency are based on the relationship between the angular rotation of the bit about its center point or origin $O_b$ 1008 of the bit coordinate system $(X_b, Y_b)$ along the $X_b$ direction 1010 and the $Y_b$ direction 1012 and further angular rotation about the center point of origin $O_h$ 1020 of the bit coordinate system $(X_h, Y_h)$ along the $X_h$ direction 1014 and the $Y_h$ direction 1016. A whirl radius ΔR 1018 is the difference in location between the origin $O_b$ 1008 of the bit coordinate system and the origin $O_h$ 1020 of the hole coordinate system.

For any point A on bit axis $X_b$, the coordinates of point A on the hole coordinate system $(X_h, Y_h)$ along the $X_h$ direction 1014 and the $Y_h$ direction 1016 as shown below, where $R_a$ is the distance from $O_b$ to the point A and ΔR is the whirl radius 1018:

$$X_h = \Delta R \cos(\Omega t) + R_a \cos(\omega t) \quad (6)$$

$$Y_h = \Delta R \sin(\Omega t) + R_a \sin(\omega t) \quad (7)$$

where ω 1002 is the angular frequency point A experiences as a result of the bit rotation about between the origin $O_b$ 1008 of the bit coordinate system and Ω 1022 is the angular frequency point A experiences as a result of bit rotation about the origin $O_h$ 1020 of the hole coordinate system, which is whirl.

Acceleration for the point A in the hole coordinate system is then given by:

$$X_a^h = -\Delta R \Omega^2 \cos(\Omega t) - R_a \omega^2 \cos(\omega t) \quad (8)$$

$$Y_a^h = -\Delta R \Omega^2 \sin(\Omega t) - R_a \omega^2 \sin(\omega t) \quad (9)$$

where acceleration is the second derivative with respect to time of position and the position of the point A is given by Eq. 6 and 7.

Acceleration in bit coordinate system is given by the projection of the acceleration in the hole coordinate system (from Eq. 8 and 9) onto the bit coordinate system, as shown below:

$$X_a^b = -\Delta R \Omega^2 \cos([\omega - \Omega]t) - R_a \omega^2 \quad (10)$$

$$Y_a^b = \Delta R \Omega^2 \sin([\omega - \Omega]t) \quad (11)$$

The accelerations measured by the on-bit sensors, which are located at the bit center at approximately the origin $O_b$ 1008 of the bit coordinate system are therefore given by:

$$X_a^b = -\Delta R \Omega^2 \cos([\omega - \Omega]t) \quad (12)$$

$$Y_a^b = \Delta R \Omega^2 \sin([\omega - \Omega]t) \quad (13)$$

where at the origin $R_a \sim 0$.

The unwrapped phase angle is given by:

$$\varphi(t) = \arctan\left(\frac{Y_a^b}{X_a^b}\right) + \varphi_0 = -[\omega - \Omega]t \quad (14)$$

where the unwrapped phase angle is the instantaneous phase mapped to a continuous function over time.

The slope of the unwrapped phase angle is then given by:

$$\frac{d\varphi(t)}{dt} = -[\omega - \Omega] \quad (15)$$

Where the slope of the unwrapped phase angle is the instantaneous angular frequency.

The whirl radius is calculated as:

$$\Delta R = \frac{A_b}{\Omega^2} \quad (16)$$

where $A_b$ is the distance from point A to the origin $O_b$ 1008 of the bit coordinate system, $\Omega$ 1022 is the angular frequency point A experiences as a result of bit rotation about the origin $O_h$ 1020 of the hole coordinate system, and $\Delta R$ is the whirl radius 1018. The whirl radius $\Delta R$ can therefore be calculated from $\Omega$ 1022 and knowledge about the location of a gyroscope or accelerometer with respect to the bit coordinate system.

The bit rotational frequency, $\omega_b$ or $\omega$ 1002, can be measured by on-bit gyroscopes. The slope of the phase angle can be obtained using Eq. 14, above. The whirl frequency $\Omega$ and the whirl radius $\Delta R$ 1018 can therefore be obtained from Eqs. 14, 15, and 16. Additionally, moving average can be applied to measurements of $(X_a^b, Y_a^b)$ and $\varphi(t)$ to reduce noise in the signals. Whirl frequency $\Omega$ can also be obtained from a frequency spectrum of either $X_a^b$ or $Y_a^b$, because the frequency $[\omega-\Omega]$ is dominant in these signals if whirl is occurring.

Whirl frequency $\Omega$ can be calculated using both Eq. 14 (in the time domain) and using the frequency domain spectrum (using the method of Eq. 15, above). These calculated whirl frequencies $\Omega$ can be compared to confirm the occurrence of bit whirl. A bit can vibrate laterally without whirl, which can produce a measurable bit whirl frequency $\Omega$ in the frequency domain of lateral signals that should not match a whirl frequency $\Omega$ calculated in the time domain based on the rotational acceleration. Alternatively, substantially similar calculated whirl frequencies $\Omega$ from both methods can confirm the presence of bit whirl.

Whirl (including backward whirl) occurs as a result of walk force of the bit, where the wellbore diameter is larger than the bit which allows walk force to cause collisions between the bit and sidewalls of the borehole. During drilling, the cutters of a drill bit experience engagement with one or more faces of a formation. Contact with a formation generates forces on each of the cutters—both lateral force ($F_s$), which can be thought of as a drag, and axial force ($F_a$). The cutter forces can be measured, modeled, or estimated from the vertical and lateral rates of penetration and a module, measurement, or calculation of the engagement of each cutter with the formation as the bit travels. Cutter forces can then be projected to the bit coordinate system and from the bit coordinate system, to the hole coordinate system.

A bit walk force, $F_w$, for the bit can be calculated in the hole coordinate system. When a lateral force, $F_s$, is applied to the bit along either of the x or y axis, the sum of the resultant cutter forces occurring along the orthogonal axis (i.e., projected along the y or x axis, respectively) is the bit walk force, as shown below:

$$F_w = \sum_1^n F_w^c \quad (17)$$

where $F_w$ is the bit walk force contributed by the cutter's side cutting action, and $F_w^c$ 1050 is the cutter walk force for each of n cutters (for simplicity, only cutters along two blades are shown). A positive bit walk force correlates with a positive bit whirl in the forward direction, while a negative bit walk force correlates with a negative bit whirl in the direction opposite to the angular rotation of the drill bit.

A walk torque, $M_x$, which occurs about the axis centered at origin $O_h$ 1020 of the hole coordinate system (i.e., the center point of the borehole), can also be calculated for each cutter. The total walk torque on the bit is given by the equation below:

$$M_w = \sum_1^n M_w^c \quad (18)$$

where $M_w^c$ is the bit walk torque contribution for each of n cutters and $M_w$ is the total bit walk torque from the contributions of all cutters.

Because bit walk force drives the bit around the borehole, the walk force of a bit corresponds to the likelihood that it experiences whirling. The bit whirl index is defined as:

$$WI = \frac{dF_w/dROL}{dWOB/dROP} \quad (19)$$

where WI is a whirl index of a bit, $F_w$ is the walk force of the bit, ROL is the rate of lateral penetration, WOB is the weight on bit, and ROP is the rate of axial penetration. $dF_w/dROL$ is the derivative of the walk force with respect to the lateral rate of penetration, and dWOB/dROP is the derivative of WOB with respect to the axial ROP. Negative bit whirl index WI corresponds to backward whirl behavior. However, if the type of whirl is specified (i.e., all instances correspond to backward whirl), the absolute value of WI can be used. WI is negative for most PDC bits. WI index can be calculated experimentally, based on data from drilling runs, or from simulations of drill bit behavior.

Figure 11A:
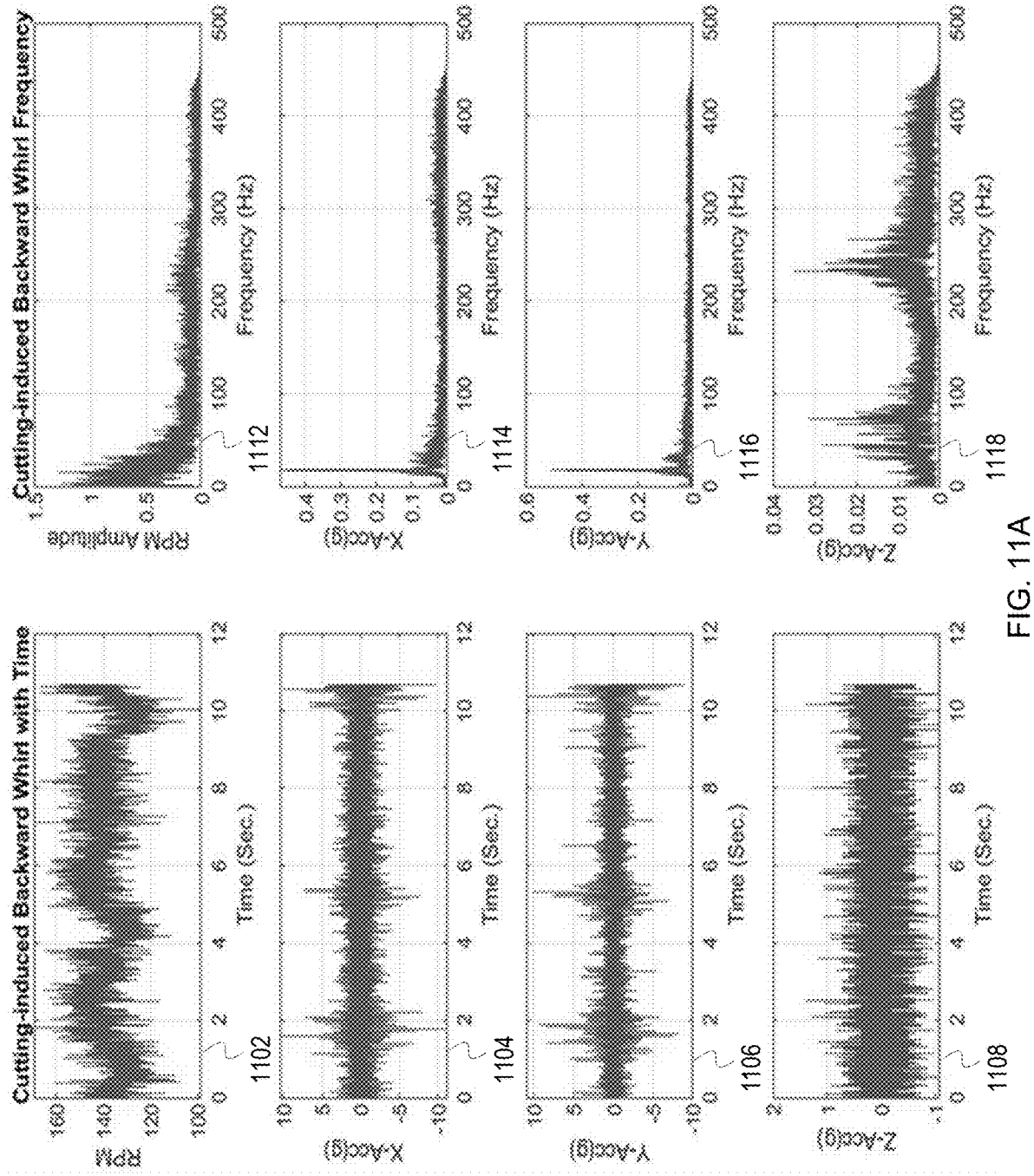
FIGS. 11A and 11B depict graphs corresponding to two example instances of cutting-induced backward whirl.
Figure 11B:
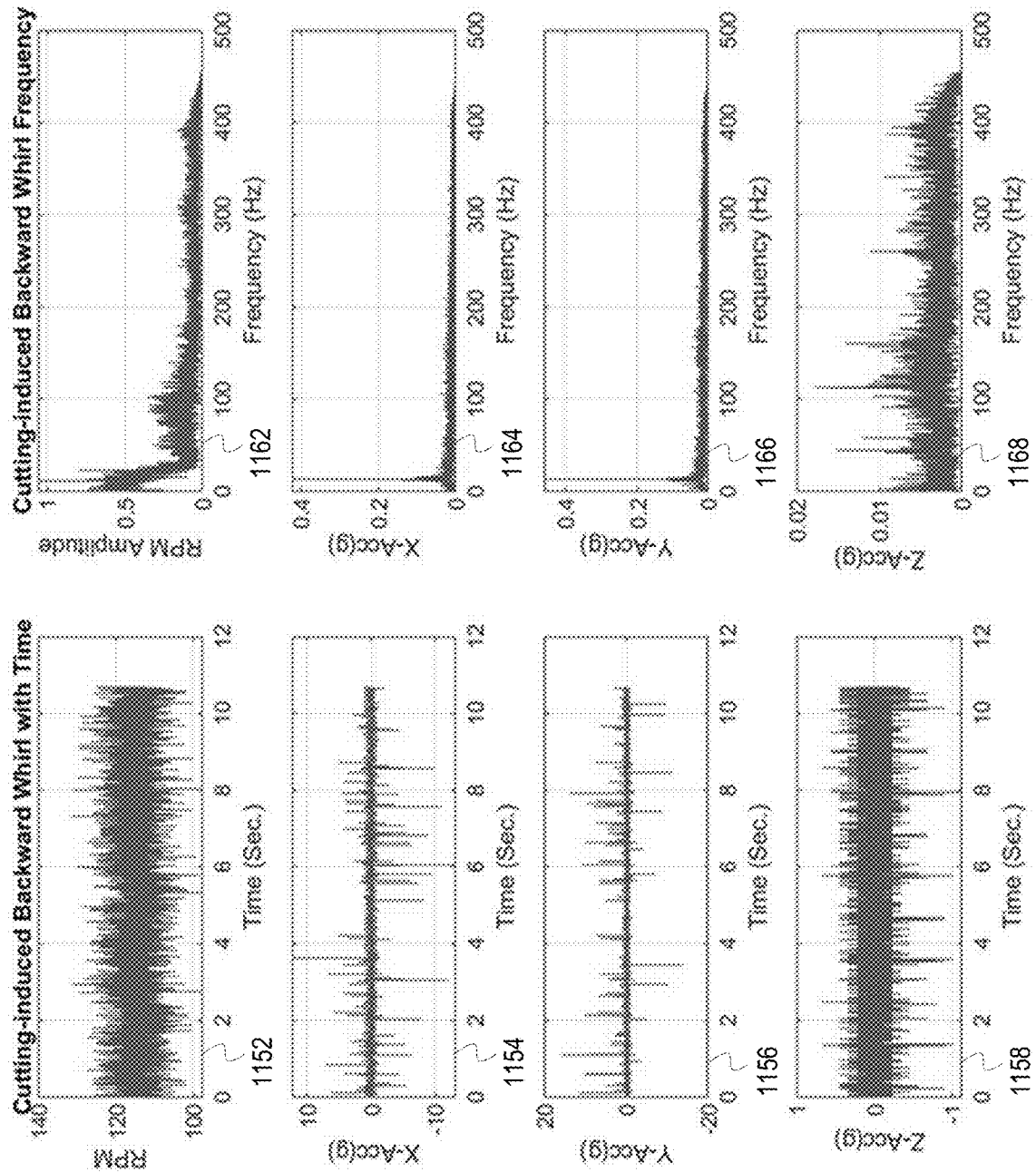

FIGS. 11A and 11B depict graphs corresponding to two example instances of cutting-induced backward whirl. FIG. 11A includes graphs 1102, 1104, 1106, and 1108 depicting vibrational measurements in the time domain, and graphs 1112, 1114, 1116, and 1118 depicting vibrational measurements in the frequency domain. The graphs show measurements obtained at a drill bit for an approximately 11 sec period of a drilling run. The graph 1102 depicts RPM as a function of time, while the graphs 1104, 1106, and 1108 depict acceleration in the x, y, and z direction (with respect to the drill bit) as a function of time. Applying a FFT to the vibrational measurements in the frequency domain (i.e., the data of the graphs 1102, 1104, 1106, and 1108), produces the frequency domain vibrational measurements shown in the graphs 1112, 1114, 1116, and 1118, respectively.

FIG. 11B includes graphs 1152, 1154, 1156, and 1158 depicting vibrational measurements in the time domain, and graphs 1162, 1164, 1166, and 1168 depicting vibrational measurements in the frequency domain. The graphs show measurements obtained at a drill bit for an approximately 11 sec period of a drilling run. The graph 1152 depicts RPM as a function of time, while the graphs 1154, 1156, and 1158 depict acceleration in the x, y, and z direction (with respect to the drill bit) as a function of time. Vibrational measurements in the frequency domain, as shown in the graphs 1162, 1164, 1166, and 1168, are obtained by applying an FFT to vibrational measurements in the time domain (i.e., the data shown in the graphs 1152, 1154, 1156, and 1158, respectively).

Cutting-induced backward whirl is identified by a characteristic backward whirl frequency, which is negative, and satisfies the relationship given below:

$$|\Omega|=\omega(N_b+1) \qquad (20)$$

where $\Omega$ is the whirl frequency, $\omega$ is the average RPM, and $N_b$ is the number of blades of the PDC bit. The whirl frequency is detected in the time and frequency domains as a dominant frequency which occurs substantially simultaneously in the lateral (i.e., x and y) directions. For cutting-induced backward whirl, the local maximum (or global maximum) in the time domain occurs at the frequency $(\omega-\Omega)$, where the relationship between $\omega$ and $\Omega$ is governed by Eq. 20, above.

The graphs of both FIGS. 11A and 11B exhibit the behaviors characteristic of cutting-induced backward whirl. In FIG. 11A, the graphs 1114 and 1116 display global maxima at approximately 18.64 Hz, which corresponds to a whirl frequency and average RPM relations ship given by $(\omega-\Omega)=18.64$ Hz in the frequency domain. For an average rotational frequency of $\omega=2.33$ Hz (which is the average rotational frequency for the drilling data represented in FIG. 11A), the whirl frequency is then calculated as $\Omega=-16.31$ Hz (which is negative as it represents a backward whirl). The calculated whirl frequency of $\Omega=-16.31$ Hz further satisfies Eq. 20 where $N_b=6$ for the six-bladed bit of the drilling data represented in FIG. 11A. The graph 1112 displays strong contributions from frequency components less than 50 Hz, but does not display a corresponding local or global maximum corresponding to the peaks of the graphs 1114 and 1116. The graph 1118, likewise, does not display a corresponding local or global maximum near 18.64 Hz, which would be present in three-dimensional coupled vibrations. In FIG. 11B, the graphs 1164 and 1166 display substantially simultaneous global maxima at approximately 12.81 Hz, or which corresponds to a relationship between whirl frequency and average RPM given by $(\omega-\Omega)=12.81$ Hz. For the average rotational frequency of $\omega=1.83$ Hz (i.e., the average rotational frequency of the drilling data of FIG. 11B), the whirl frequency is then calculated as $\Omega=-10.98$ Hz. This frequency satisfies with Eq. 20 where $N_b=5$ for the five-bladed PDC bit of the drilling data represented in FIG. 11B. The graph 1162 displays strong contributions from frequency components below 20 Hz, and weaker but still significant contributions from frequency components below 100 Hz. The graph 1162 does not display a peak at or near 12.81 Hz (i.e., substantially simultaneous with the peaks of the graphs 1164 and 1166) at a magnitude statistically significant above the noise or variance of the RPM value. The graph 1168 likewise does not display a corresponding local or global maximum near 7 Hz.

Figure 12A:
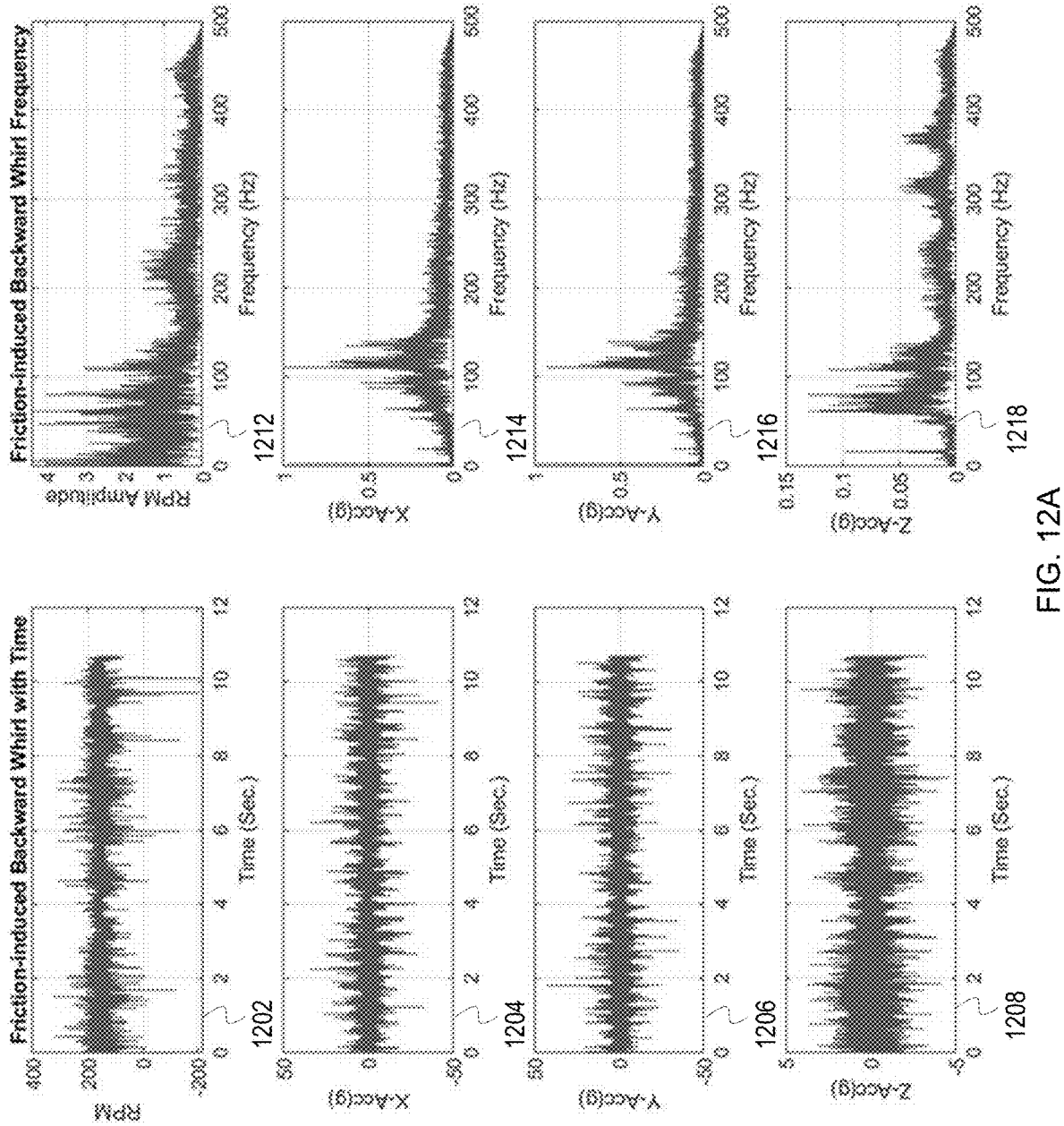
FIGS. 12A and 12B depict graphs corresponding to two example instances of friction-induced backwards whirl.
Figure 12B:
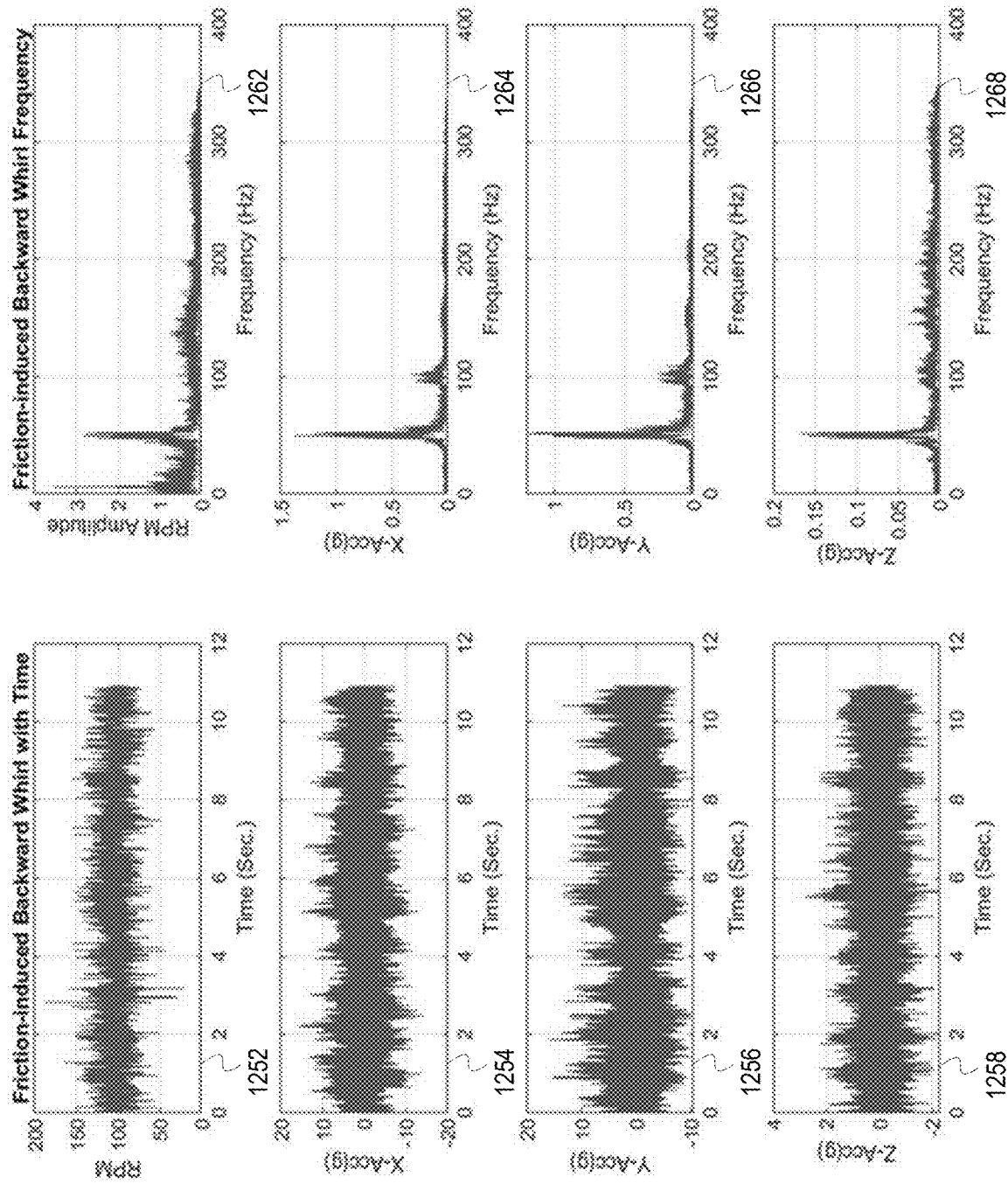

FIGS. 12A and 12B depict graphs corresponding to two example instances of friction-induced backward whirl. FIG. 12A includes graphs 1202, 1204, 1206, and 1208 depicting vibrational measurements in the time domain, and graphs 1212, 1214, 1216, and 1218 depicting vibrational measurements in the frequency domain. The graphs show measurements obtained at a drill bit for an approximately 11 sec period of a drilling run. The graph 1202 depicts RPM as a function of time, while the graphs 1204, 1206, and 1208 depict acceleration in the x, y, and z direction (with respect to the drill bit) as a function of time. Applying a FFT to the vibrational measurements in the frequency domain (i.e., the data of the graphs 1202, 1204, 1206, and 1208), produces the frequency domain vibrational measurements shown in the graphs 1212, 1214, 1216, and 1218, respectively.

FIG. 12B includes graphs 1252, 1254, 1256, and 1258 depicting vibrational measurements in the time domain, and graphs 1262, 1264, 1266, and 1268 depicting vibrational measurements in the frequency domain. The graphs show measurements obtained at a drill bit for an approximately 11 sec period of a drilling run. The graph 1252 depicts RPM as a function of time, while the graphs 1254, 1256, and 1258 depict acceleration in the x, y, and z direction (with respect to the drill bit) as a function of time. Vibrational measurements in the frequency domain, as shown in the graphs 1262, 1264, 1266, and 1268, are obtained by applying an FFT to vibrational measurements in the time domain (i.e., the data shown in the graphs 1252, 1254, 1256, and 1258, respectively).

Friction-induced backward whirl is identified by a characteristic backward whirl frequency, which is negative, and satisfies the relationship given below:

$$|\Omega|>\omega(N_b+1) \qquad (21)$$

where $\Omega$ is the whirl frequency, $\omega$ is the average RPM, and $N_b$ is the number of blades of the PDC bit. The whirl frequency is detected in the time and frequency domains as a dominant frequency which occurs substantially simultaneously in the lateral (i.e., x and y) directions and is a high frequency (e.g., greater than 40 Hz). For friction-induced backward whirl, the local maximum (or global maximum) in the frequency domain occurs at the frequency $(\omega-\Omega)$, where the relationship between $\omega$ and $\Omega$ is governed by Eq. 20, above. Further, $(\omega-\Omega)$ is greater than 50 Hz in most cases where friction-induced backward whirl occurs. Friction-induced backward whirl can occasionally manifest together with three-dimensional coupled vibrations which are weakly coupled across axes. In these cases, friction-induced backward whirl is distinguished from three-dimensional coupled vibrations by a lower amplitude in RMP, if whirl frequencies are not calculated directly.

The graphs of both FIGS. 12A and 12B exhibit the behaviors characteristic of friction-induced backward whirl. In FIG. 12A, the graphs 1214 and 1216 display global maxima at approximately 110 Hz. The graph 1212 displays strong contributions from frequency components less than 110 Hz, but does not display a local or global maximum corresponding to the peaks of the graphs 1214 and 1216. The graph 1218 displays strong contributions from frequency components in the range between 50 Hz and 150 Hz, but the strongest frequency peaks are lower than those of the graphs 1214 and 1216. In FIG. 12B, the graphs 1264 and 1266 display global maxima at approximately 70 Hz and a further weaker satellite peak with a local maximum at approximately 100 Hz. The graphs 1262 and 1628 which display the frequency components of RPM and axial acceleration, respectively, also display global maxima at approximately 70 Hz. This is consistent with friction-induced backward whirl which produces coupled vibrations across three-dimensions. The graph 1252, which displays RPM amplitude in the time domain, displays RPM values dispersed between 80 and 150 rev/min, which is lower than expected for three-dimensional coupled vibrations. As shown in the graphs 802 and 852 of FIGS. 8A and 8B, high variation and high amplitude RPM signals are characteristics of three-dimensional coupled vibrations.

The classification of a classified vibrational disfunction can be communicated to an operator or drilling parameter controller, and the identified vibrational disfunction can be mitigated in real time (or otherwise during drilling). The real time mitigation occurs through adjustment of one or more drilling parameters, where the drilling parameters include RPM, weight on bit (WOB), torque on bit (TOB), rate of penetration (ROP), rate of lateral penetration (ROL), depth of cut (DOC), etc. Further mitigation or mitigation in subsequent runs can be accomplished through drill bit design. Drill bit designs can be changed between run or for future runs. In some cases, drill bit design parameters, such as average DOC or depth of cut controller (DOCC) parameters (e.g., average DOCC contact area, average WOB taken off by the DOCCs, etc.), can be adjusted during drilling based on drilling parameter adjustment. Drill bits can be altered or improved based on predictions of which types of vibrational disfunction corresponds to various formation type or strata, previous experience in the current field, or type of drilling plans (e.g., lateral or directional drilling plans).

Drilling efficiency (DE) is a parameter that reflects the ability of a drill bit to turn mechanical energy into rock or formation destruction. Boreholes are generated by tensile and compressive and shear deformation causing rock failure or breakdown, and thereby borehole creation. DE can be calculated theoretically, estimated from drilling data, or determined based on simulation of drilling runs. DE is determined in part by drill bit design parameters. The drill bit design parameters can include bit dimensions, shape of bit profile, number of blades, number of cutters, type of cutters, back rake angle, side rake angle, primary cutter layout, backup cutter layout, gauge pad aggressiveness, etc. Drill bit design parameters can also include depth of cut controller (DOCC) parameters, such as area of contact, weight on bit taken off by the DOCCs, torque on bit taken off by the DOCCs, critical depth of cut (CDOC), etc., where DOCCs are controllers which apply force to separate the drill bit from the formation face thereby controlling the depth of cut. Depth of cut (DOC) is a measurement of how much of the formation is removed per revolution of the drill bit. Drill bit design parameters are determined by the physical shape of the components of the drill bit, but some drill bit parameters can also be affected by drilling parameters—especially average values such as average DOC, average DOCC contact area, etc.

The drilling efficiency (DE) is given by Equation 22, below:

$$DE = \frac{\sigma_{rock}}{E_s} * 100\% \quad (22)$$

where $\sigma_{rock}$ is the rock compressive strength and $E_s$ is the mechanical specific energy as given in Equation 23, below. $E_s$ is given in pounds per square inch (psi) as:

$$E_s = \frac{WOB}{A} + \frac{120\pi * RPM * TOB}{A * ROP} \quad (23)$$

where A (in square inches or in$^2$) is the cross-sectional area of hole drilled by the drill bit, WOB is the weight on bit, TOB is torque on bit, ROP is rate of penetration, and RPM is revolutions per minute (rev/min) of the drill bit. DE as calculated using Eqns. 21 and 22 depends on both formation information, i.e., rock compressive strength, and on drilling parameters, i.e., WOB, TOB, ROP, and RPM. DE depends on drilling parameters, where the drilling parameters include WOB, TOB, ROP, and RPM, and on drill bit design parameters.

DE of a PDC bit can be calculated theoretically from the PDC bit design parameters, where formation and drilling parameters are assumed or averaged, and can be therefore used as a proxy for the total design and its efficiency. DE can also be calculated for different formation and drilling parameters and averaged to provide an average DE.

Mitigation strategies vary as a function of identified vibrational disfunction. Mitigation of cutting-induced stick-slip can occur in real time through increased bit RPM and reduction of WOB. Cutting-induced stick-slip can be reduced in subsequent drilling runs or predictively through the use of drill bits with increased DE and through the use of in-cone depth of cut controllers (DOCCs). Cutting-induced stick-slip is less common in drill bits with in-cone DOCCs where the interaction between the formation face and cutters is controlled by the DOCCs. Mitigation of friction-induced stick-slip during drilling can be accomplished by adjustment of drilling parameters that reduce lateral vibrations and BHA contact with borehole walls. Friction-induced stick-slip can be reduced in subsequent drilling runs by reducing the amount of contact between the drill bit and the borehole walls, such as through reductions in gauge size or use of fewer sidewall cutters. Friction-and-cutting-induced stick-slip can be mitigated in real time through reduction of WOB or by methods that reduce lateral vibration. Drill bits can be designed with in-cone DOCCs, with high DE, and with reduced BHA contact with sidewalls of the borehole in order to preemptively reduce or prevent friction-and-cutting-induced stick-slip. Reduction of drillpipe-induced stick-slip focuses on drillpipe design, such as reducing lateral vibrations of the drillpipe and the contact area between the drillpipe and the borehole walls. This can be accomplished through careful design of radii of any lateral turns (such as for horizontal drilling or direction drilling), and through selection of drilling mud composition or additives.

Three-dimensional coupled vibrations can be mitigated in real time through reduction of WOB and reduction of lateral vibrations. Drill bit cutting structures can be designed with high DE (i.e., DE above approximately 40%) to reduce or avoid three-dimensional coupled vibrations. In-cone DOCCs reduce the occurrence of three-dimensional coupled vibrations, while full gauge drill bits increase their probability. Drill bits with non-full gauges correspond to reduced likelihood of three-dimensional coupled vibrations. High frequency torsional noise can be considered a non-harmful vibration, where HFTN is not harmful to drill bit and BHA lifetimes and therefore does not necessitate mitigation.

Cutting-induced backward whirl is less likely for drill bits with high DE and with bit whirl index less than 100%, so mitigation focusses on increasing DE and reducing bit whirl index to less than 100%. Friction-induced backward whirl is also less likely for drill bits with high DE and with bit whirl index less than 100%, so mitigation strategies are similar to those of cutting-induced backwards whirl. Reducing contact between the BHA or the bit (including bit gauge) and the sidewall of a borehole also reduced the probability for friction-induced backward whirl. Both DE and bit whirl index can be calculated as a function of drill bit design. DE and bit whirl index are also affected by DOC, both axial and lateral depth of cut, and can be adjusted during drilling by adjustment of drilling parameters such as DOC, RPM, ROP, ROL, etc. Backward whirl is a vibrational disfunction that can self-propagate. Backward whirling causes enlargement of the borehole, which allows further backward whirling to occur where the drill bit or BHA bounces around the radius of the expanded borehole. Backward whirling can be mitigated by intervals of reduced RPM, after which drilling speed (or ROP) can subsequently be increased once the borehole diameter is small enough to prevent backward whirl.

Figure 13:
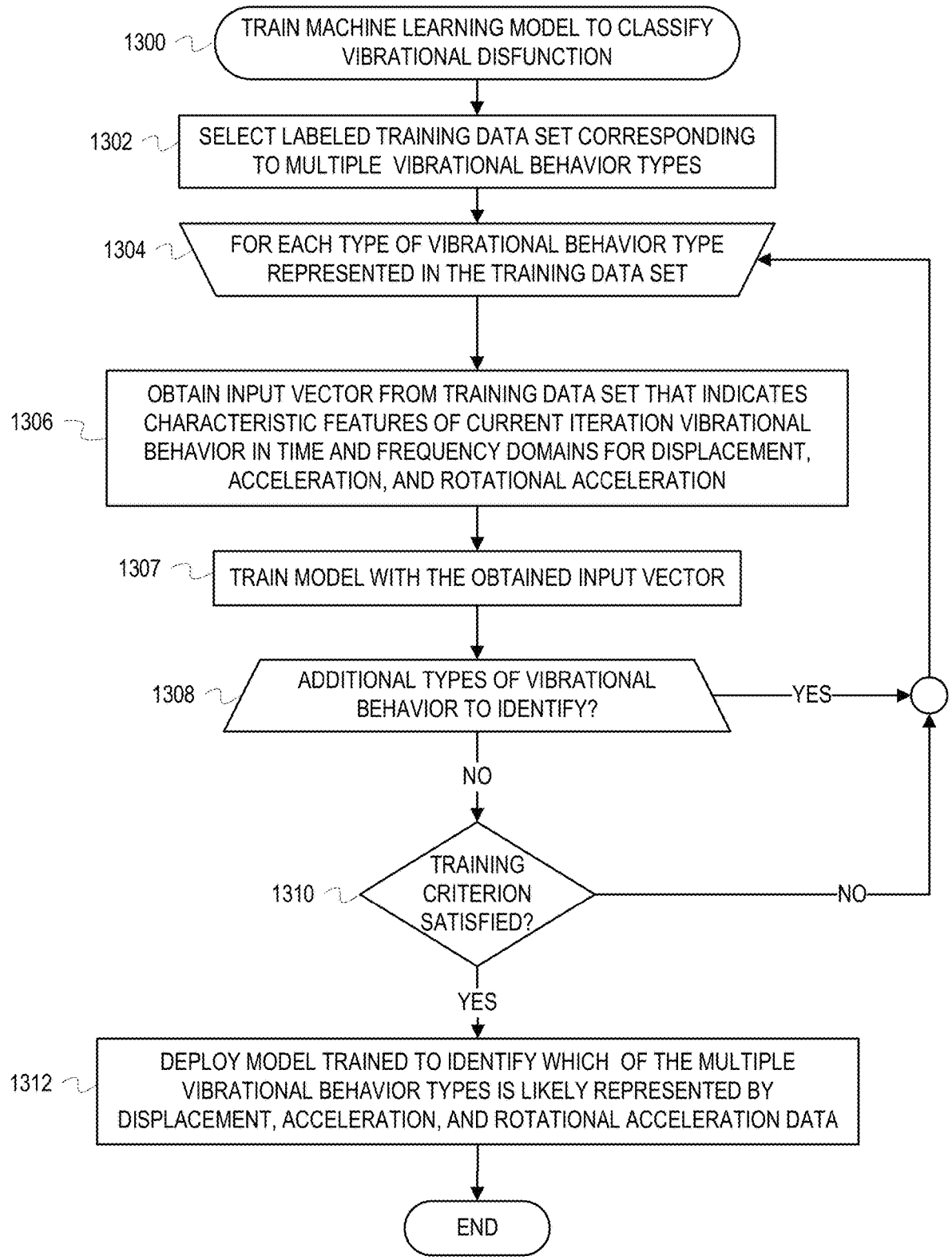
FIG. 13 is a flowchart of example operations for training a ML model to classify vibrational behavior.

FIG. 13 is a flowchart of example operations for training a ML model to classify vibrational behavior. A flowchart 1300 contains example operations described with reference to a vibrational disfunction ML model trainer and a vibrational disfunction classifier for consistency with the earlier figures.

At block 1302, a vibrational disfunction ML model trainer selects a labeled training data set corresponding to multiple vibrational behavior types. The vibrational behavior types can be those previously described (e.g., normal drilling, cutting-induced stick-slip, friction-induced stick-slip, friction-and-induced stick-slip, drillpipe-induced stick-slip, three-dimensional coupled vibrations, high frequency torsional noise, cutting-induced backward whirl, and friction-inducted backward whirl) or can include additional drilling types or any other type of vibrational disfunction. Optionally, drilling disfunctions can be classified into fewer vibrational behavior types, such as stick-slip, backward whirl, high frequency vibrations, etc. that include one or more sub types of drilling disfunctions. The data set can include training data labeled as corresponding to two or more types of vibrational behavior, including two or more types of drilling disfunction. The data set can include training data labeled as corresponding to a primary type of vibrational behavior and a secondary type of vibrational behavior. The vibrational disfunction ML model trainer can further generate or refine characteristic features used to identify the two or more types of vibrational disfunction.

The training data set includes measurements of at least one of displacement, velocity, acceleration, angular displacement, angular velocity, and angular acceleration in at least one of the time domain and the frequency domain. The data of the data set can comprise 10-12 sec intervals of drilling data, as previously shown. Optionally, the data can be longer or shorter in duration. Additionally, the data can be of different durations depending on the type of labeled vibrational behavior. For example, data labeled as corresponding to stick-slip behaviors can be of approximately 1 minute (min) in duration or longer. Data length can correspond to the frequency of stick and slip phases, where at least one stick phase and at least one slip phase are required to identify stick-slip type vibrational disfunction. The vibrational disfunction ML model trainer can select data corresponding to each of a single type of vibrational behavior first, and after training is complete on the unmixed sets further train the algorithm to identify two or more vibrational disfunction types with mixed data sets. Optionally, the vibrational ML model trainer can test the algorithm against mixed data sets.

At block 1304, the vibrational ML model trainer selects a type of vibrational behavior of the selected labeled data for the current iteration. The vibrational disfunction ML model trainer can select the vibrational behavior type in each iteration according to different implementations. The vibrational disfunction ML model trainer can select types of vibrational behavior training data based on a pre-determined order, based on available input, or based on narrowest criteria for vibrational disfunction type identification to broadest. For example, normal drilling data can be used as final classification training data, or the ML model trainer can determine that any drilling data that does not exhibit characteristic behavior identified as corresponding to any vibrational disfunction can by default be normal drilling behavior. Alternatively, training can occur from broadest criteria to narrowest, based on the method for model training selected. Optionally, based on the model selection, training can occur on data corresponding to multiple types of vibrational behavior in the same iteration—including training occurring on data sets corresponding to all types of vibrational behavior or on all available labeled training data sets in the same iteration.

At block 1306, the vibrational disfunction ML model trainer obtains input vectors from the training data set that indicate the characteristic features of the vibrational data of the current iteration, where the characteristic features for the selected vibrational behavior appears in at least one of displacement, velocity, acceleration, rotational displacement, rotational velocity, and rotational acceleration. The characteristic features can be identified in either the time or frequency domain. The characteristic features of each vibrational behavior can be identified as one or more feature value or feature vector for training purposes. The input vectors can include one or more arrays of data points (i.e., RPM over time) corresponding to movement data, where movement data includes at least one of displacement, velocity, acceleration, rotational displacement, rotational velocity, and rotational acceleration in at least one of the time domain and the frequency domain. The input vectors can include one or more arrays calculated based on movement data, such as where data in the frequency domain is calculated from data in the time domain using a FFT or another transform. Additionally, higher level classification can be utilized through the generation of complex feature construction, in which an operation on one of more feature values or feature vectors produces a more complex variable representative of complex characteristic features. The input vector can include both measured and calculated feature values. The characteristic features can be identified as an array of data points, e.g., values of RPM over time, or as a calculated input feature, e.g., global and local maxima of the frequency components in x and y directional acceleration.

The feature space, which contains the feature vectors, can be pre-selected or can be created by the vibrational disfunction ML model trainer. Complex features and additional feature vectors increase the complexity and dimensionality of the ML model training. Complexity can therefore be inversely related to speed and ease of machine learning. Optionally, the vibrational disfunction ML model trainer can be increasingly sophisticated in subsequent iterations.

At block 1307, the vibrational disfunction ML model trainer trains the ML model with the obtained input vectors of the current iterations. The input vectors generated in block 1306 from data labeled as corresponding to the vibrational behavior of the current iteration identified in block 1304 are fed into the vibrational disfunction ML model trainer in order to train a ML model to classify the selected type of vibrational behavior. The vibrational disfunction ML model trainer can train a classifier based on supervised or unsupervised learning. The classifier can be Bayesian, linear, binary, cluster analysis, etc. The vibrational disfunction ML model trainer can output an algorithm which operates on at least one of at least one of displacement, velocity, acceleration, rotational displacement, rotational velocity, and rotational acceleration in at least one of the time domain or the frequency domain. The ML model can be selected based on the input vectors, the number of inputs, the number of outputs, etc. The ML model can be trained on the labeled data as supervised learning. The ML model can be a classification model.

At block 1308, the vibrational disfunction ML model trainer determines if additional types of vibrational behavior remain for training. If additional types of vibrational behavior remain to identify flow continues to block 1304 where an additional vibrational behavior type is selected. If all selected types of vibration disfunction have been identified, or all data analyzed, flow continues to block 1310.

At block 1312, the ML model trained to identify which of the multiple vibrational behavior types is likely represented by at least one of displacement, velocity, and acceleration data is deployed. The vibrational disfunction ML model trainer can deploy the trained ML model, or the ML model can be otherwise deployed to a processor, controller, etc. operating in communication with a source of movement data. The ML model can be loaded onto a processor or controller of a drill bit or BHA and deployed downhole.

The ML model can be updated or improved based on additional training or training with additional labeled data. The vibrational disfunction ML model trainer can be updated with further training, included training based on higher quality data sets or an additional type of identified vibrational behavior.

Figure 14:
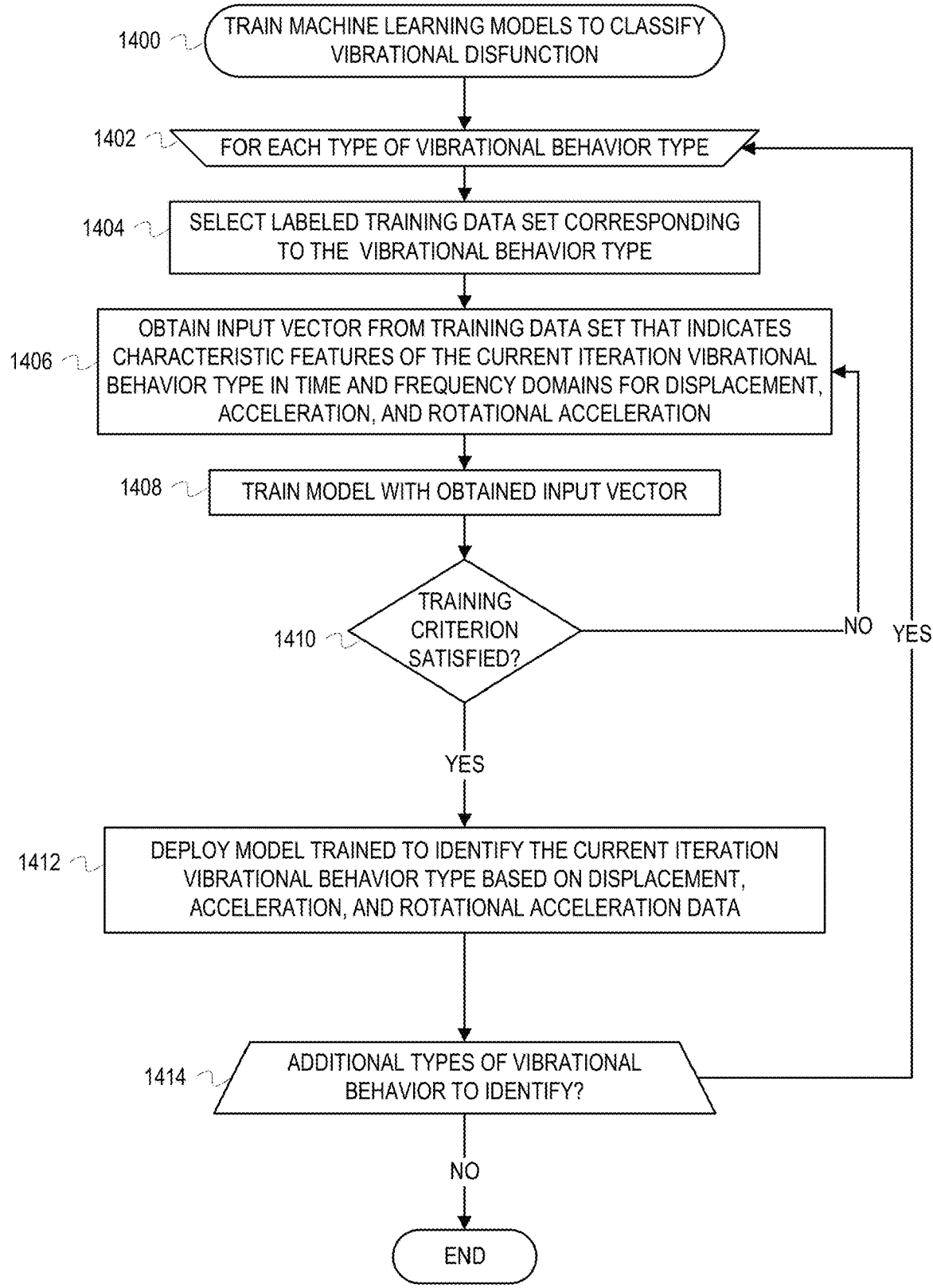
FIG. 14 is a flowchart of example operations for training two or more ML models to classify vibrational behavior.

FIG. 14 is a flowchart of example operations for training multiple ML models to classify vibrational behavior. A flowchart 1400 contains example operations described with reference to a vibrational disfunction ML model trainer and a vibrational disfunction classifier for consistency with the earlier figures.

At block 1402, a vibrational ML model trainer begins iterating through different vibrational behavior types represented in a labeled training data set to train ML models. The example operations iterated include those represented by blocks 1404, 1406, 1408, 1410, and 1412. Embodiments are not limited to training a ML model to detecting or identifying a single vibrational behavior type. Embodiments can train a ML model to detect or identify a specified combination of disfunctional vibrational behavior types. For instance, a first ML model can be trained to detect cutting-induced stick-slip and friction-induced stick-slip disfunctional vibration behavior and a second ML model can be trained to detect three-dimensional coupled vibrations and friction-induced backward whirl behavior.

At block 1404, the vibrational disfunction ML model trainer selects labeled training data of a data set corresponding to the vibrational behavior type of the current iteration. This example operation is similar to the example operation represented by block 1302.

At block 1406, the vibrational disfunction ML model trainer obtains input vectors from the training data set that indicate the characteristic features of the vibrational data of the current iteration, where the characteristic features for the selected vibrational behavior occur in at least one of displacement, velocity, acceleration, rotational displacement, rotational velocity, and rotational acceleration. This example operation is similar to the example operation represented by block 1306.

At block 1408, the vibrational disfunction ML model trainer trains the ML model with the obtained input vectors of the current iterations. This is similar to the example operation represented by block 1307.

At block 1410, the vibrational disfunction ML model trainer determines if the training criterion is satisfied. This is similar to the example operation represented by block 1310. If the training criterion is satisfied, flow continues to block 1412. If the training criterion is not satisfied, flow continues to block 1406.

At block 1412, the ML model trained to identify one vibrational behavior type or a specific combination of vibrational behavior types as represented by at least one of displacement, velocity, and acceleration data is deployed.

At block 1414, the vibrational disfunction ML model trainer determines if additional types of vibrational behavior remain for training. If additional types of vibrational behavior remain to identify flow continues to block 1402 where an additional vibrational behavior type is selected, and an additional ML model is trained. If all selected types of vibration disfunction have been identified, or all data sets analyzed, flow continues ends.

Figure 15:
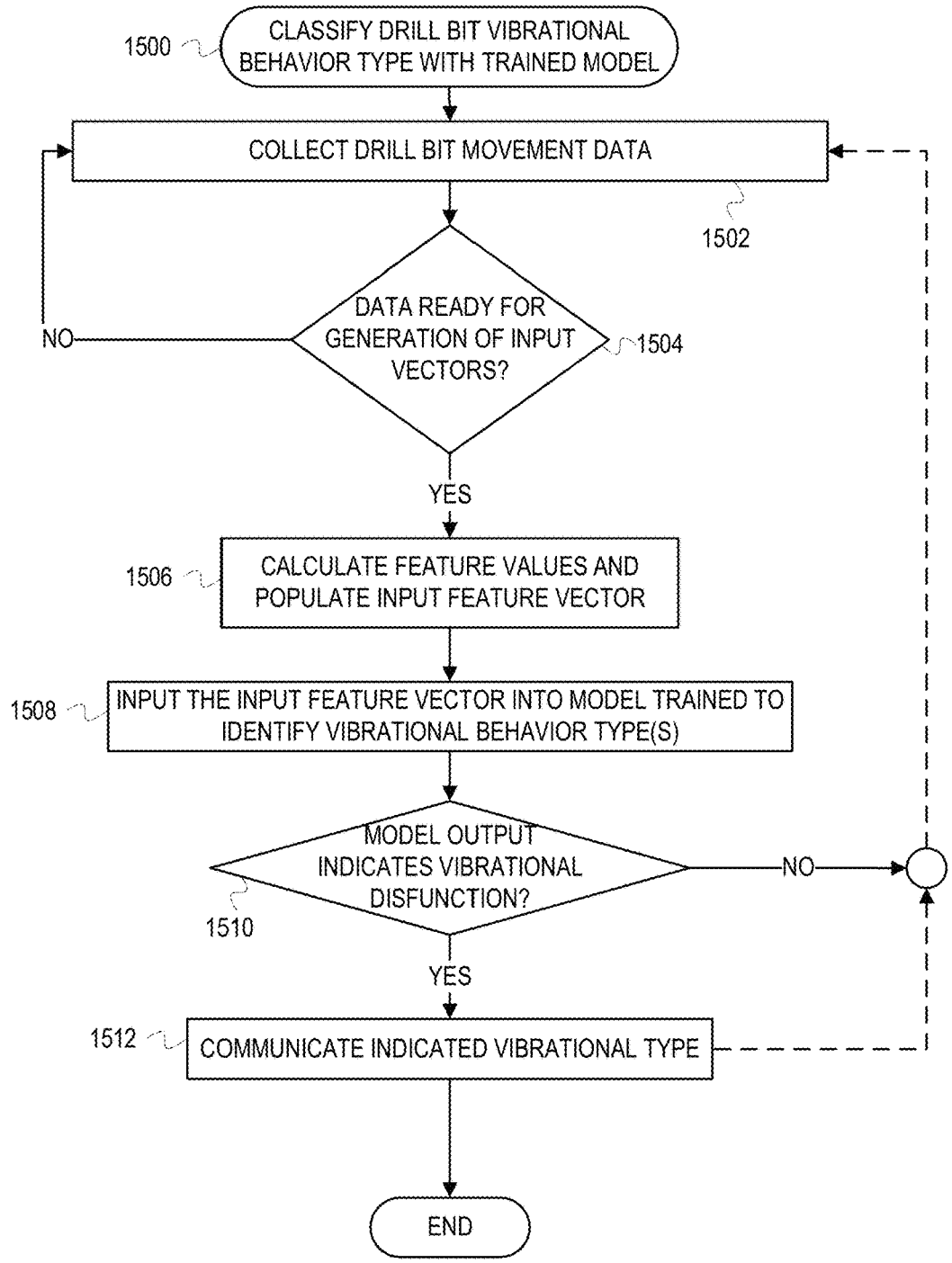
FIG. 15 is a flowchart of example operations for classifying vibrational behavior with a ML model.

FIG. 15 is a flowchart of example operations for classifying vibrational behavior with a trained ML model. A flowchart 1500 contains example operations described that refer to the trained ML model as a vibrational disfunction classifier for consistency with the earlier figures. The vibrational disfunction classifier can operate at the drill bit or at another location based on vibrational data collected at the drill bit of in the BHA. The vibrational disfunction classifier can classify vibrational disfunction occurring in real time or can optionally operate on previously collected drilling data to classify vibrational disfunction.

At block 1502, the vibrational disfunction classifier collects drill bit movement data. Drill bit movement data comprises at least one of displacement, velocity, acceleration, rotational displacement, rotational velocity, and rotational acceleration in at least one of the time domain or the frequency domain. Optionally, one or more of these values may be measured elsewhere on the BHA. Drill bit movement data can be measured by the vibrational disfunction classifier, or can be transmitted to the vibrational disfunction classifier. Drill bit movement data can be stored in one or more buffer, queue, or other long term or short-term storage media of the vibrational disfunction classifier. Optionally, drill bit movement data can include data recorded from a completed or previous drilling run, in its entirety or divided into two or more time periods.

At block 1504, the vibrational disfunction classifier determines if the collected data is ready for input vectors to be generated. Input vectors can be generated as a function of a time period or a time window. The time periods can be of a set value or length, i.e., 10 sec, 1 min, 2 min, etc., or can be of a variable length, such as between 10 sec and 5 min. Instead of a time period, a time window may be selected, where the vibrational disfunction classifier operates in a backwards looking manner on data collected over a time window. In such as case, the time window may be of a set value or length, or may be variable. Time windows or time periods may overlap. For example, the vibrational disfunction classifier can operate once a minute on vibrational data recorded over the previous two minutes—and in this case vibrational data could fall into at least two time periods or time windows. The rate at which the vibrational disfunction classifier generates input vectors can be pre-selected or can vary as a function of one or more drilling parameters, such as rate of penetration (ROP), lateral turning radius, RPM, etc. The vibrational disfunction classifier can also generate input vectors of different lengths (e.g., to detect different types of vibrational behavior). For example, the vibrational disfunction classifier can generate one or more feature value for detection of stick-slip vibrational behavior types based on a time period of up to 5 mins, while also generating other feature values based on shorter time periods. The input feature vector can include input feature values for different time periods or time windows. Optionally, the vibrational disfunction classifier can generate input vectors when input buffers or queues reach a pre-determined amount of data. This amount of data may or may not correspond to a variable time period.

At block 1506, the vibrational disfunction classifier calculates feature values and populates one or more input feature vector. The feature values can be one or more array of data points, such as RPM as a function of time, or can be one or more calculated or complex feature values, such as average RPM, variance in RPM over a time length or time window. Feature values can vary based on the input vectors used to train the vibrational disfunction classifier. Feature values can correspond to one or more characteristic feature of one or more type of vibrational behavior. The input feature vector contains multiple feature values. Feature values can be null or zero if the characteristic feature of a vibrational behavior is absent or cannot be calculated in the currently collected drill bit movement data.

At block 1508, the input feature vector is input to the ML model trained to identify one of multiple vibrational behavior types. The input feature vector can be input as a data string, multiple arrays, multiple feature values, etc. of the n dimensional feature space. The vibrational disfunction classifier can read input feature vector values from memory, queues, buffers, etc., or the vibrational classifier can output the feature vector to the trained ML model. The vibrational disfunction classifier can include the trained ML model, and can feed the calculated input feature vector to the algorithm of the ML model.

At block 1510, the vibrational disfunction classifier indicates a vibrational behavior type as an output of the trained ML model. The collected drill bit movement data is identified as corresponding to at least one of normal drilling or a vibrational disfunction type by the vibrational disfunction classifier. The vibrational disfunction classifier, previously trained by the vibrational disfunction ML model trainer of flowchart 1300 of FIG. 13 or another model trainer, classifies the drilling behavior as corresponding to one or more type of vibrational behavior, i.e., one or more type of vibrational disfunction or as corresponding to normal drilling.

At block 1512, the vibrational disfunction classifier communicates the indicated vibrational behavior type. For example, the vibrational disfunction classifier can communicate the identified type of vibrational behavior (i.e., the identified type of vibrational disfunction or normal drilling) to an operator or drilling controller at the surface via mud pulse telemetry. The communication can occur as mud pulse telemetry communication of one or more numbers or bit patterns pre-determined as corresponding to the identified type of vibration behavior. Optionally, the communication can occur via radiofrequency (RF) communication via antennas, optical communication along fiber optic cables, over electrical signals, etc. Additionally, the drilling data can be transmitted to the surface or another secondary location by the drill bit via any allowable method and the vibrational defunction classifier can operate on drilling data at the surface or at the secondary location. The vibrational disfunction classifier may be part of the drilling controller or in direct communication with the drilling controller. The drilling controller may be a processor, controller, or another software or hardware system that independently controls drilling, such as autonomous drilling, or may be a system that presents drilling parameters such as ROP, RPM, etc. to an operator for control. The vibrational disfunction classifier can also communicate the vibrational disfunction and one or more mitigation strategies to an operator or other drilling controller. Based on the communicated vibrational disfunction or normal drilling behavior, one or more drilling parameters can be adjusted. For a communicated vibrational disfunction, the vibrational disfunction can be mitigated based on the identity of the vibrational disfunction and its associated mitigation strategies (as previously discussed). Drilling, collection of vibrational data, classification of one or more vibrational disfunction, and mitigation of the identified vibrational disfunction can occur repeatedly during drilling. Repeated adjustment of drilling parameters during drilling can be based on communicated output of the vibrational disfunction classifier. Once the indicated vibrational type is communicated, flow continues to block 1502 if more drill bit movement data is collected. Flow between blocks 1512 and 1502 can be asynchronous. If no further drill bit movement data is collected, flow ends.

Figure 16:
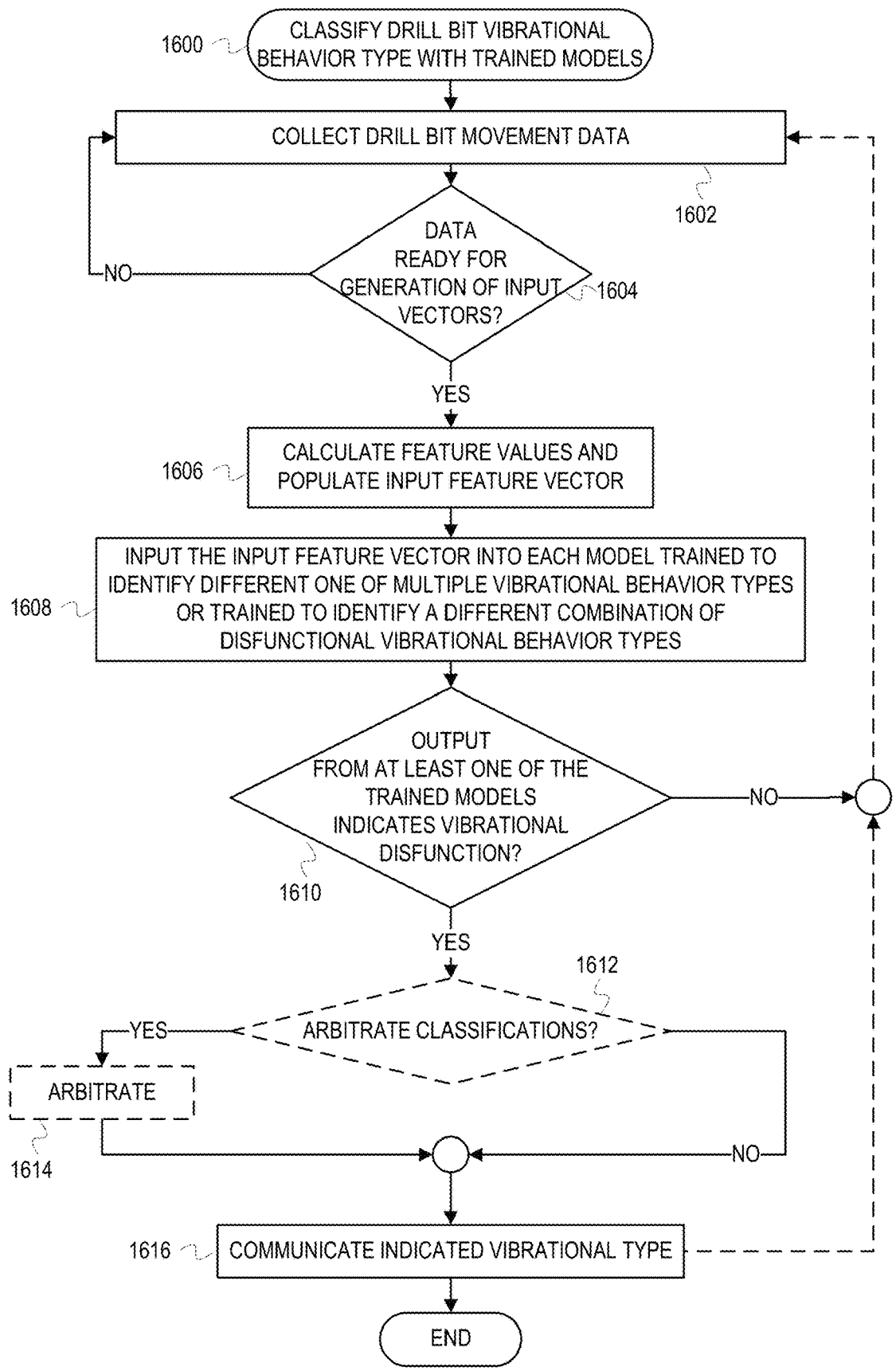
FIG. 16 is a flowchart of example operations for classifying vibrational behavior with two or more ML models.

FIG. 16 is a flowchart of example operations for classifying vibrational behavior with multiple ML models. A flowchart 1600 contains example operations described with reference to a vibrational disfunction classifier for consistency with the earlier figures. The vibrational disfunction classifier can operate at the drill bit or at another location based on vibrational data collected at the drill bit of in the BHA. The vibrational disfunction classifier can classify vibrational disfunction occurring in real time or can optionally operate on previously collected drilling data to classify vibrational disfunction.

At block 1602, the vibrational disfunction classifier collects drill bit movement data. This is similar to the example operation of block 1502.

At block 1604, the vibrational disfunction classifier determines if the collected data is ready for input vectors to be generated. This is similar to the example operation of block 1504. If not ready, flow returns to block 1602 for collection of additional drill bit movement data. Otherwise, flow continues to block 1606.

At block 1606, the vibrational disfunction classifier calculates feature values and populates multiple input feature vectors. Each ML model can correspond to one or more input feature vectors. Input feature vectors can vary between each of the multiple ML models. One or more feature value can occur in input feature vectors for one or more of the multiple ML models. Alternatively, one or more ML model can operate on an input feature vector with feature values distinct from any feature values or input feature vectors of the other of the multiple ML models. The feature values can be one or more array of data points, or can be one or more calculated or complex feature values. Feature values can vary based on the input vectors used to train the vibrational disfunction classifier. Feature values can correspond to one or more characteristic feature of each type of vibrational behavior. The input feature vector contains multiple feature values. Feature values can be null or zero if the characteristic feature of a vibrational behavior is absent or cannot be calculated in the collected drill bit movement data.

At block 1608, the input feature vector is input to the multiple ML models trained to identify one of multiple vibrational behavior types or a combination of disfunctional vibrational behavior types. The input feature vector can be input as a data string, multiple arrays, multiple feature values, etc. of the n dimensional feature space. The vibrational disfunction classifier can read input feature vector values from memory, queues, buffers, etc., or the vibrational classifier can output the feature vector to the trained ML model. The vibrational disfunction classifier can include the multiple trained ML models, and can feed the calculated input feature vector to the algorithm of the ML models. Input of feature vectors to the multiple ML models can be asynchronous.

At block 1610, if the vibrational disfunction classifier determines if output from at least one trained ML model indicates vibrational disfunction. The ML models of the vibrational disfunction classifier can operate on different time scales, so the vibrational disfunction classifier determines if the output of any of the models indicates vibrational disfunction (or normal drilling behavior) is detected. Detection can be asynchronous. The collected drill bit movement data is identified as corresponding to normal drilling or at least one of a vibrational disfunction type by the vibrational disfunction classifier. The vibrational disfunction classifier, containing multiple ML models, classifies the drilling behavior as corresponding to one or more type of vibrational behavior, i.e., one or more type of vibrational disfunction or as corresponding to normal drilling. If a disfunctional vibrational behavior type is indicated, flow continues to block 1612. If no vibrational disfunction is indicated, flow returns to block 1602 where more drill bit movement data is collected.

At block 1612, the vibrational disfunction classifier optionally determines whether to arbitrate classifications output by the trained models. The vibrational disfunction classifier can compare the output of the multiple ML models to determine if more than one type of vibrational behavior is indicated. If one model indicates that a first type of vibrational behavior is present, and all other models indicate that no other type of vibrational behavior is present in the drill bit movement data, then no arbitration is performed. However, arbitration can be performed in cases where multiple models indicate the presence of disparate types of vibrational behavior. Arbitration of indicated classifications is optional—in some cases all indicated types of vibrational behavior can be indicated or communicated. If arbitration is indicated, flow continues to block 1614. If arbitration is not indicated, flow continues to block 1616.

At block 1614, the vibrational disfunction classifier optionally arbitrates between multiple indicated types of vibrational disfunction. Arbitration can be based on confidence intervals or other probability information output by one or more of the multiple models. Arbitration can be based on confidence in each of the ML models themselves, where some models may be inherently more accurate than other models. Arbitration can be based on a hierarchy of models, based on accuracy of their respective outputs or one narrowness of determined feature values and characteristic behavior. For example, if both a first ML model trained to identify friction-induced backward whirl and a second ML model trained to identify three-dimensional coupled vibrations indicate the presence of their respective vibrational behaviors, the vibrational disfunction classifier can determine that friction-induced backward whirl is a subset of three-dimensional coupled vibrations and therefore determine that friction-induced backward whirl is the more accurate classification.

At block 1616, the vibrational disfunction classifier communicates the indicated vibrational behavior type. For example, the vibrational disfunction classifier can communicate the identified type of vibrational behavior, i.e., the identified type of vibrational disfunction or normal drilling, to an operator or drilling controller at the surface via mud pulse telemetry. Optionally, the communication can occur via radiofrequency (RF) communication via antennas, optical communication along fiber optic cables, over electrical signals, etc. Additionally, the drilling data can be transmitted to the surface or another secondary location by the drill bit via any allowable method and the vibrational defunction classifier can operate on drilling data at the surface or at the secondary location. In such as case, the vibrational disfunction classifier may be part of the drilling controller or in direct communication with the drilling controller. Drilling, collection of vibrational data, classification of one or more vibrational disfunction, and mitigation of the identified vibrational disfunction can occur repeatedly, iteratively, or periodically during drilling. Repeated adjustment of drilling parameters during drilling (as vibrational disfunctions are detected) can be based on communicated output of the vibrational disfunction classifier. The drilling controller may be a processor, controller, or another software or hardware system that independently controls drilling, such as autonomous drilling, or may be a system that presents drilling parameters such as ROP, RPM, etc. to an operator for control. Once the indicated vibrational type is communicated, flow continues to block 1602 if more drill bit movement data is collected. If not drill bit movement data is collected, flow ends.

The example operations are described with reference to a vibrational disfunction ML model trainer and a vibrational identification classifier for consistency with the earlier figure (s). The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 1506 and 1508 can be performed in parallel or concurrently. With respect to FIG. 15, a transmission to the surface is not necessary. With respect to FIG. 16, arbitration is not necessary. Dashed lines represent functions which can be asynchronous. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 17:
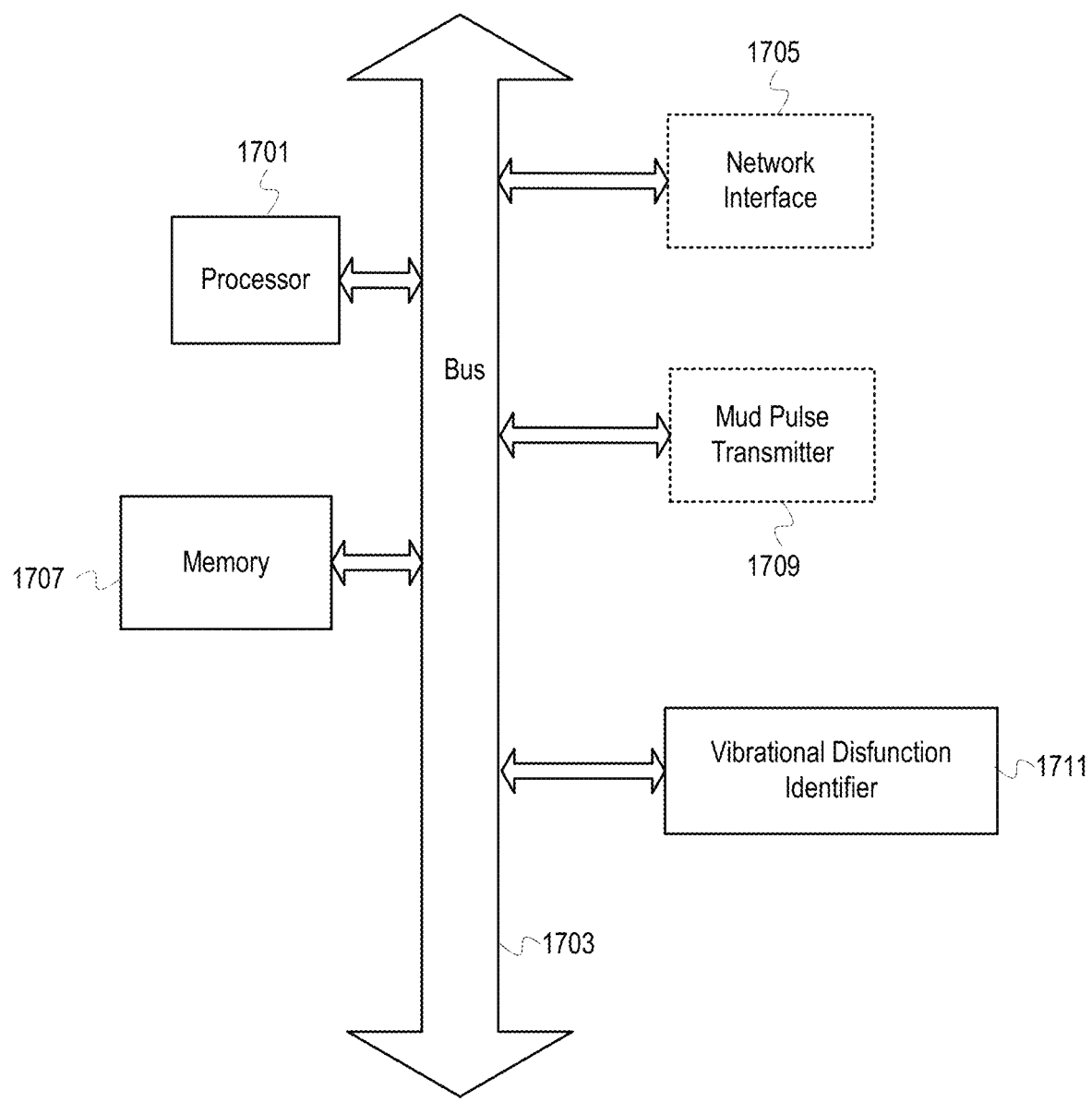
FIG. 17 depicts an example computer system with a vibrational disfunction classifier and mud pulse data transmitter.

FIG. 17 depicts an example computer system with a vibrational disfunction classifier and mud pulse data transmitter. The computer system includes a processor 1701 (possibly including multiple processors, multiple cores, multiple nodes, and/or implementing multi-threading, etc.). The computer system includes memory 1707. The memory 1707 may be system memory or any one or more of the above already described possible realizations of machine-readable media. The computer system also includes a bus 1703 and a network interface 1705. The system also includes the vibrational disfunction classifier 1711 and the mud pulse transmitter 1709. The vibrational disfunction classifier 1711 can include one or more measurement apparatus for collecting information about drill bit movement, vibration, or oscillation. The mud pulse transmitter 1709 is optional. The mud pulse transmitter may be part of the vibrational disfunction identifier 1711, or the vibrational disfunction identifier 1711 can be in communication with the mud pulse transmitter 1709 or a controller of a mud pump which can function as a mud pulse transmitter 1709. Any one of the previously described functionalities may be partially (or entirely) implemented in hardware and/or on the processor 1701. For example, the functionality may be implemented with an application specific integrated circuit, in logic implemented in the processor 1701, in a co-processor on a peripheral device or card, etc. Further, realizations may include fewer or additional components not illustrated in FIG. 17 (e.g., video cards, audio cards, additional network interfaces, peripheral devices, etc.). The processor unit 1701 and the network interface 1705 are coupled to the bus 1703. Although illustrated as being coupled to the bus 1703, the memory 1707 may be coupled to the processor 1701.

While the aspects of the disclosure are described with reference to various implementations and exploitations, it will be understood that these aspects are illustrative and that the scope of the claims is not limited to them. In general, techniques for vibrational disfunction classification as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
generating input vectors across multiple time windows based, at least partly, on data collected from sensors associated with a drill bit,
wherein the data collected from the sensors correspond to at least two axes of the drill bit,
wherein the input vectors comprise rotational velocities across a corresponding time window and movement of the drill bit in each axis across the corresponding time window;
inputting each of the input vectors into a trained machine learning model to classify vibrational behavior represented by the input vector;
determining whether output from the trained machine learning model classifies the vibrational behavior of the drill bit as disfunctional and indicates a cause of the vibrational behavior; and
indicating a first vibrational disfunction based, at least partly, on the output of the trained machine learning model, the first vibrational disfunction including a type of the vibrational behavior and the cause of the vibrational behavior.

2. The method of claim 1, wherein the data collected from the sensors comprises at least one of displacement, velocity, acceleration, rotational displacement, rotational velocity, and rotational acceleration in at least one of a time domain or a frequency domain for the drill bit.

3. The method of claim 1, wherein indicating the first vibrational disfunction comprises communicating the first vibrational disfunction.

4. The method of claim 3, wherein communicating the first vibrational disfunction comprises communicating the first vibrational disfunction via mud pulse telemetry.

5. The method of claim 1, further comprising mitigating the first vibrational disfunction.

6. The method of claim 5, wherein mitigating the first vibrational disfunction comprises adjusting at least one of a drilling parameter and a drill bit design parameter.

7. The method of claim 1, wherein the trained machine learning model has been trained to identify a plurality of vibrational disfunctions that comprises at least two of friction-induced stick-slip, cutting-induced stick-slip, friction-and-cutting-induced stick-slip, drillpipe-induced stick-slip, three-dimensional coupled vibrations, high frequency torsional noise, cutting-induced backward whirl, and friction-induced backward whirl.

8. The method of claim 1, further comprising determining that output of the trained machine learning model classifies the vibrational behavior represented by the input vector as multiple vibrational disfunctions including the first vibrational disfunction.

9. The method of claim 8, further comprising indicating a second vibrational disfunction in addition to the first vibrational disfunction based on determining that the trained machine learning model output classifies the vibrational behavior represented by the input vector as multiple vibrational disfunctions.

10. The method of claim 1, further comprising inputting each of the input vectors into a second trained machine learning model to classify vibrational behavior represented by the input vector, wherein the trained machine learning model has been trained to identify a first set of one or more vibrational disfunctions and the second trained machine learning model has been trained to identify a second set of one or more vibrational disfunctions.

11. The method of claim 10, further comprising inputting each of the input vectors into a third trained machine learning model that has been trained to identify non-disfunctional vibration behavior.

12. The method of claim 10, further comprising determining classification of the vibrational behavior represented by the input vector based, at least partly, on outputs of the trained machine learning model and the second trained machine learning model.

13. The method of claim 1, further comprising:
determining an output from a second trained machine learning model classifies the vibrational behavior of the drill bit as a second vibrational disfunction different than the first vibrational disfunction; and
determining whether to arbitrate classification outputs by the trained machine learning model and the second trained machine learning model.

14. A non-transitory, machine-readable medium having instructions stored thereon that are executable by a computing device, the instruction comprising instructions to:
generate input vectors across multiple time windows based, at least partly, on data collected from sensors associated with a drill bit,
wherein the data collected from the sensors correspond to at least two axes of the drill bit,
wherein the input vectors comprise rotational velocities across a corresponding time window and movement of the drill bit in each axis across the corresponding time window;
input each of the input vectors into a trained machine learning model to classify vibrational behavior represented by the input vector;
determine whether output from the trained machine learning model classifies the vibrational behavior of the drill bit as disfunctional and indicates a cause of the vibrational behavior; and
indicate a first vibrational disfunction based, at least partly, on the output of the trained machine learning model, the first vibrational disfunction including a type of the vibrational behavior and the cause of the vibrational behavior.

15. The non-transitory, machine-readable medium of claim 14, wherein the instructions further comprise instructions to communicate the first vibrational disfunction.

16. The non-transitory, machine-readable medium of claim 14, wherein the instructions further comprise instructions to mitigate the first vibrational disfunction.

17. The non-transitory, machine-readable medium of claim 14, wherein the instructions further comprise instructions to:
determine whether output of the trained machine learning model classifies the vibrational behavior represented by the input vector as multiple vibrational disfunctions including the first vibrational disfunction.

18. The non-transitory, machine-readable medium of claim 14, wherein the instructions further comprise instructions to,
input each of the input vector into a second trained machine learning model to classify vibrational behavior represented by the input vector,
wherein the trained machine learning model has been trained to identify a first set of one or more vibrational disfunctions and the second trained machine learning model has been trained to identify a second set of one or more vibrational disfunctions.

19. An apparatus comprising:
a processor; and
a computer-readable medium having instructions stored thereon that are executable by the processor to cause the apparatus to,
generate input vectors across multiple time windows based, at least partly, on data collected from sensors associated with a drill bit,
wherein the data collected from the sensors correspond to at least two axes of the drill bit,
wherein the input vectors comprise rotational velocities across a corresponding time window and movement of the drill bit in each axis across the corresponding time window;
input each of the input vectors into a trained machine learning model to classify vibrational behavior represented by the input vector;
determine whether output from the trained machine learning model classifies the vibrational behavior of the drill bit as disfunctional and indicates a cause of the vibrational behavior; and
indicate a first vibrational disfunction based, at least partly, on the output of the trained machine learning model, the first vibrational disfunction indicating including a type of the vibrational behavior and the cause of the vibrational behavior.

20. The apparatus of claim 19, further comprising instructions to communicate the first vibrational disfunction.

21. The apparatus of claim 19, further comprising instructions to,
input each of the input vectors into a second trained machine learning model to classify vibrational behavior represented by the input vector,
wherein the trained machine learning model has been trained to identify a first set of one or more vibrational disfunctions and the second trained machine learning model has been trained to identify a second set of one or more vibrational disfunctions.

22. A method comprising:
drilling a wellbore using a drill bit,
inputting data collected from sensors associated with the drill bit into a trained machine learning model to classify vibrational behavior of the drill bit;
determining whether output from the trained machine learning model classifies the vibrational behavior of the drill bit as disfunctional and indicates a cause of the vibrational behavior;
indicating a first vibrational disfunction based, at least partly, on the output of the trained machine learning model, the first vibrational disfunction including a type of the vibrational behavior and the cause of the vibrational behavior; and
mitigating the vibrational behavior of the drill bit based, at least partly, on the indication of the first vibrational disfunction.

23. The method of claim 22, wherein the data collected from the sensors comprises at least one of displacement, velocity, acceleration, rotational displacement, rotational velocity, and rotational acceleration in at least one of a time domain or a frequency domain for the drill bit along at least two axes.

24. The method of claim 22, wherein the mitigating comprises:
adjusting at least one drilling parameter based, at least partly, on the indication.

25. The method of claim 24, wherein the at least one drilling parameter comprises at least one of rotational velocity, rate of penetration, rate of lateral penetration, weight on bit, torque on bit, depth of cut, and drilling efficiency.

26. The method of claim 24, wherein the at least one drilling parameter comprises at least one drill bit parameter, and wherein the at least one drill bit parameter comprises at least one of bit dimensions, shape of bit profile, number of blades, number of cutters, type of cutters, back rake angle, side rake angle, primary cutter layout, backup cutter layout, gauge pad aggressiveness, depth of cut controller area of contact, weight on bit taken off by depth of cut controllers, torque on bit taken off by depth of cut controllers, critical depth of cut, drilling efficiency, and bit whirl index.

27. The method of claim 22, wherein indicating the first vibrational disfunction comprises generating a notification to at least one of a controller or operator based, at least in part, on the output of the trained machine learning model.

28. The method of claim 27, wherein the mitigating comprises mitigating the vibrational behavior based, at least in part, on the notification.

29. The method of claim 22, further comprising:
inputting data collected from the sensors of the drill bit into a second trained machine learning model to classify the vibrational behavior of the drill bit;
determining whether output from the second trained machine learning model classifies vibrational behavior of the drill bit as disfunctional; and
indicating a second vibrational disfunction based, at least partly, on the output of the second trained machine learning model,
wherein mitigating the vibrational behavior of the drill bit is also based on the indication of the second vibrational disfunction.

* * * * *